(12) United States Patent
Jaroker

(10) Patent No.: US 8,346,897 B2
(45) Date of Patent: Jan. 1, 2013

(54) SYSTEM AND METHOD FOR DEPLOYING AND MAINTAINING SOFTWARE APPLICATIONS

(76) Inventor: Jon Jaroker, New York, NY (US)

(*) Notice: Subject to any disclaimer, the term of this patent is extended or adjusted under 35 U.S.C. 154(b) by 1157 days.

(21) Appl. No.: 12/200,654

(22) Filed: Aug. 28, 2008

(65) Prior Publication Data
US 2009/0217163 A1 Aug. 27, 2009

Related U.S. Application Data

(60) Provisional application No. 61/031,350, filed on Feb. 25, 2008, provisional application No. 61/075,166, filed on Jun. 24, 2008.

(51) Int. Cl.
*G06F 15/177* (2006.01)
*G06F 9/445* (2006.01)
(52) U.S. Cl. .................. 709/220; 717/174
(58) Field of Classification Search .............. 709/220; 717/174
See application file for complete search history.

(56) References Cited

U.S. PATENT DOCUMENTS

| | | | |
|---|---|---|---|
| 5,421,009 A | 5/1995 | Platt | 395/600 |
| 5,555,416 A | 9/1996 | Owens et al. | 395/700 |
| 5,666,501 A | 9/1997 | Jones et al. | 345/348 |
| 5,854,897 A | 12/1998 | Radziewicz et al. | 395/200.54 |
| 5,859,969 A | 1/1999 | Oki et al. | 395/200.3 |
| 6,073,214 A | 6/2000 | Fawcett | 711/133 |
| 6,301,666 B1 | 10/2001 | Rive | 713/200 |
| 6,725,260 B1 | 4/2004 | Philyaw | 709/220 |
| 6,854,112 B2* | 2/2005 | Crespo et al. | 717/174 |
| 6,865,737 B1* | 3/2005 | Lucas et al. | 717/178 |
| 7,802,243 B1* | 9/2010 | Feeser et al. | 717/169 |
| 2002/0016956 A1 | 2/2002 | Fawcett | |
| 2002/0083429 A1* | 6/2002 | Rozenfeld et al. | 717/174 |
| 2003/0046371 A1 | 3/2003 | Falkner | |
| 2003/0078036 A1 | 4/2003 | Chang et al. | |

(Continued)

FOREIGN PATENT DOCUMENTS

EP 0 592 079 A2 4/1994

(Continued)

OTHER PUBLICATIONS

Stallman, R.M. et al., "GNU Make, A Program for Directing Recompilation", GNU Make, Apr. 2006, Edition 0.70 for make Version 3.81, 188 pages.

(Continued)

*Primary Examiner* — Larry Donaghue
(74) *Attorney, Agent, or Firm* — Blakely, Sokoloff, Taylor & Zafman LLP

(57) ABSTRACT

A method and system for software deployment or maintenance where procedures for software installation or maintenance are defined by a skilled individual; site-specific or confidential information is separated from operating system native commands; parameterized commands referencing a hierarchy of variables are acquired by another individual; site-specific or confidential information of the other individual is combined with parameterized commands; new operating system native commands are generated; and, the new operating system native commands are execute on a computing system to reproduce the procedures for software installation or maintenance originally defined by the skilled individual.

The software deployment or maintenance procedures originally defined by the skilled individual may be applied to any number of computing systems maintained by any number of other individuals without the skilled individual's further involvement in the process. The site-specific or confidential information belonging to the other individuals is not shared with the skilled individual.

32 Claims, 16 Drawing Sheets

U.S. PATENT DOCUMENTS

| | | | |
|---|---|---|---|
| 2003/0195949 A1 | 10/2003 | Slivka et al. | |
| 2004/0012628 A1* | 1/2004 | Kropf et al. | 345/744 |
| 2004/0068723 A1 | 4/2004 | Graupner et al. | |
| 2004/0148385 A1 | 7/2004 | Srinivasan | |
| 2006/0031832 A1 | 2/2006 | Kishida | |
| 2007/0106984 A1 | 5/2007 | Olsen et al. | |

FOREIGN PATENT DOCUMENTS

| | | |
|---|---|---|
| EP | 1 189 136 A2 | 3/2002 |
| EP | 1 376 345 A2 | 1/2004 |
| JP | 10091454 | 4/1998 |
| JP | 2006318293 | 11/2006 |
| KR | 2006072422 | 12/2004 |
| WO | WO 03001377 | 1/2003 |
| WO | WO 2004097566 | 11/2004 |

OTHER PUBLICATIONS

Mancinelli et al., "Managing the complexity of Large Free and Open Source Package-Based Software Distributions'" IEEE 2006.

Martel et al., "Remote Management of Distributed Application", IEEE 2004.

Na et al., "Design and Implementation of Sync Engine for Automatic Installation System of PDA Application Programs", IEEE 2003.

Kusek et al., "Mobile Agent Based Software Operation and Maintenance", 7$^{th}$ International Conference on Telecommunications—2003.

Lovrek et al., "Improving Software Maintenance by Using Agent-Based Remote Maintenance Shell", Proceedings of the International Conference on Software Maintenance (ICSM-03) 2003.

Chandra et al., "Remote Security Anchoring of Remote User Identification", IBM TBD May 1998.

Devlin et al., "Local Area Network Diagnostics for a Remote Program Load Environment", IBM TDB Mar. 1994.

Evans et al., "Remote Subscription Services", IBM TBD Jun. 1994.

Hickerson et al. "Managing networked workstations", IEEE Spectrum Apr. 1992.

* cited by examiner

JohnSmith34 →AcmeCo → 2 Rodeo Dr, CA → HR → SVR002 → VM:Email → IMAP Svr  8030

Show Levels [6] [5] [4] [3] [2] [1] [0] [ALL]  —8010

| Variable Name — 8040 | Type —8050 | Value —8060 | Description —8070 |
|---|---|---|---|
| JohnSmith34 (no unique attributes) ...->AcmeCo->2RodeoDr.CA ->HR->SRV002 | | | |
| Admin Password | String | ABC123 | Root login for SRV002 |
| ...>VM:Email | | | |
| Domain | str:domain | acmeco.com | Email domain for VM:Email server |
| MX Priority | int | 0 | Default value is 0 |
| MX Entry  8000 | str:domain | acmeco.com | Domain entry (typically same as Domain) |
| External IP Address | str:IP | 66.23.124.56 | WAN IP Address |
| ...->IMAP Svr | | —8020 | |
| Accounts | List | *Account List* | User Name, Email Address, Password |
| Default Mailbox Size | int:MB | 10 | Set to 0 for unlimited size |
| Catch All Address | str:email | set catch all | All un-routable email is delivered here |
| Auto Responders | List | *Responder List* | Used for automatic response to email |
| Email Filters | List | *Filter List* | Recipient-specific email handling |
| Email Forwarding | List | *Forwarding List* | Sender-specific email handling |
| Mailing Lists | List | *Mailing List* | Email broadcasting to user groups |

| | Targets (231) | Arrangement (8) | Acme Co (12) | 66.13.56.1 (4) | Alerts (8) | History (340) | Sort By ... |
|---|---|---|---|---|---|---|---|
| | Target ID ▲ | Location▲ | WAN IP▲ | Status ▲ | | | AgentID▲ |
| ☐ | EmailSvr01 | 150 Madison Ave | 66.13.56.10 | Alert: HD capacity 98% | | | 123 |
| ☐ | Asterisk01 | 123 Main Ave | 96.12.15.120 | Available | —13010 | | 124 |
| ☐ | NAS02 | 150 Madison Ave | 66.13.56.10 | Monitored: Healthy | | | AcmeCo_8 |
| ☐ | NAS03 | 150 Madison Ave | 66.13.56.10 | Available | | | 125 |
| ☐ | NAS04 | 150 Madison Ave | 66.13.56.10 | Connected: 3 sessions active | | | 126 |
| ☐ | DNS01 | 150 Madison Ave | 66.13.56.10 | Connected: 1 session active | | | 128 |
| ☐ | DNS02 | 150 Madison Ave | 66.13.56.10 | Available | | | 129 |
| ☐ | Asterisk01 | 150 Madison Ave | 66.13.56.10 | Available | | | 135 |
| ☐ | Asterisk02 | 123 Main Ave | 96.12.15.120 | Executing: Acme Company Default Image | | | 137 |
| ☐ | NAS01 | 123 Main Ave | 96.12.15.120 | Available | 13020 | | 138 |
| ☐ | NAS02 | 123 Main Ave | 96.12.15.120 | FAILURE: Hard Drive Failure | | | AcmeCo_9 |
| ☐ | NAS03 | 123 Main Ave | 96.12.15.120 | Paused: Acme Company Default Image | | | 144 |
| ☐ | DNS01 | 123 Main Ave | 96.12.15.120 | Waiting: Terminate Script then Shutdown | | | 143 |
| ☐ | DNS02 | 123 Main Ave | 96.12.15.120 | Waiting: Terminate Script then Reboot | | | 145 |
| ☐ | DNS03 | 123 Main Ave | 96.12.15.120 | Available | | | 200Madis |
| ☐ | SPARE01 | 150 Madison Ave | 66.13.56.10 | UNUSUAL: High number of failed login attempts | | | |
| ☐ | SPARE02 | 150 Madison Ave | 66.13.56.10 | Available | 13030 | | 148 |
| ☐ | SPARE03 | 150 Madison Ave | 66.13.56.10 | Available | | | 149 |

[Add Target] [Remove] [Reboot] [Shutdown] [Logout] [Pause] [Resume] [CONTROL]

Figure 13

SYSTEM AND METHOD FOR DEPLOYING AND MAINTAINING SOFTWARE APPLICATIONS

CROSS-REFERENCE TO RELATED APPLICATIONS

The present invention claims priority to Provisional Patent Application No. 61/031,350, filed Feb. 25, 2008, entitled "Automation of Software Installation," and Provisional Patent Application No. 61/075,166, filed Jun. 24, 2008, entitled "System and Method for Deploying and Maintaining Software Applications" the entireties of which are incorporated herein by reference.

FIELD

An embodiment of the present invention describes a method and system for software deployment or maintenance where: procedures for software installation or maintenance are defined by a skilled individual; site-specific or confidential information is separated from operating system native commands; parameterized commands referencing a hierarchy of variables are acquired by another individual; site-specific or confidential information of the other individual is combined with parameterized commands; new operating system native commands are generated; and, the new operating system native commands are execute on a computing system in order to reproduce the procedures for software installation or maintenance originally defined by the skilled individual.

The software deployment or maintenance procedures originally defined by the skilled individual may be applied to any number of computing systems maintained by any number of other individuals without the skilled individual's further involvement in the deployment or maintenance process. The site-specific or confidential information belonging to the other individuals is not shared with the skilled individual.

BACKGROUND

For software applications to satisfy a business's or individual's needs, the applications must be installed, integrated, configured and maintained. Traditional approaches to software deployment, documentation or maintenance require the tacit knowledge and hand-on interaction of an Information Technology (IT) expert, making each software deployment difficult to automate or reproduce. This traditional approach to converting software into a useful form is expensive and time consuming, even though many useful software applications are available free and under open-source licenses.

Businesses have common operating requirements that are satisfied by software applications. For example, telephony, customer relationship management, vendor management, accounting and financial reporting are software-based systems most businesses use today. The procedures to install software for one company could be applied to another company, but for the need to integrate and customize that software into a new environment with different user lists, passwords, network settings and so on.

Along these lines, the present invention presents a new way to define, parameterize, transfer, generate and execute software installation and maintenance procedures so that a standardized installation and maintenance process may be automatically deployed into different environments.

SUMMARY

One aspect of the present invention automates the way IT systems are designed, documented, deployed or maintained. Unlike traditional, craft-like IT processes, an embodiment of the present invention allows an IT expert to design a solution which may be deployed by unrelated and less-skilled users. An embodiment of the invention described herein makes this possible by separating customer- and site-specific configuration details from the software installation instructions.

Another aspect of the present invention preferably encapsulates intangible know-how into a process that may be sold to or shared with others. For instance, an IT expert can design a patient management solution for a dentist's office to manage patient records, appointments and reminders and sell that solution directly to dentists' offices. This solution can be deployed and customized for each customer without the IT expert having to be physically present to install and configure the various software applications.

Yet another aspect of the present invention also allows an IT system to be maintained more securely than currently possible: instead of granting access to a company's internal network, where confidential information resides, an IT expert can monitor and maintain a system remotely without ever getting direct access to system passwords or files. In addition, the present invention enhances the technical abilities of average IT administrators. Administrators with an average skill level can obtain and deploy IT systems which would otherwise be too costly or time-consuming to deploy from scratch. These IT systems may be created by specialists, allowing their know-how to be used by others. Finally, an embodiment of the present invention includes the ability to document system installation and configuration allowing other IT experts to quickly understand a particular system's design, allowing them to replicate that system elsewhere.

According to one aspect, the present invention relates to a system and method to automate the software installation, documentation or configuration process to remote computing devices over a network. The remote computing device is comprised of at least a processing unit, re-writable memory and network interface. The remote computing device is not required to have hard disk storage, video keyboard, or mouse. It may be a virtual computer that is delivered on-demand as a service.

A network-based version of the system may have a "control agent" application, "border controllers," web-based interfaces, a library of previously created software installation procedures, reused scripts, site-specific information (e.g. IP addresses), confidential information (e.g. customer lists, password), automated configuration procedures for virtual servers, automated configuration updates or a communication link (e.g. TCP/IP, HTTPS, SIP, SSH, reverse SSH, VNC, or similar).

The system may include specific services such as remote network analysis, remote data recovery, remote security monitoring and remote computer support. Preferably, the system can encapsulate an IT expert's knowledge so that it may be sold and deployed by any user without further intervention by the IT expert. Moreover, the system can sell computing resources to other users and specify a schedule when the resources will be available.

BRIEF DESCRIPTION OF THE DRAWINGS

Further features and advantages of the invention can be ascertained from the following detailed description that is provided in connection with the drawings below:

FIG. 8 is a user interface diagram showing an embodiment for maintaining variables and their values;

FIG. 13 is a user interface diagram showing an embodiment of target activity monitoring;

DETAILED DESCRIPTION

1. Overview

According to one aspect, the present invention is a System comprising a software application running on a network-based computing platform or a host computer that allows an individual with technical skills to define computer software installation, configuration or maintenance procedures where site-specific or confidential information is separated from operating system native commands and outputs. In one embodiment, another user may acquire these installation, configuration or maintenance procedures so that the System may combine them with the other user's own site-specific or confidential information to generate a new set of computer software installation, configuration or maintenance procedures.

Figure 1:
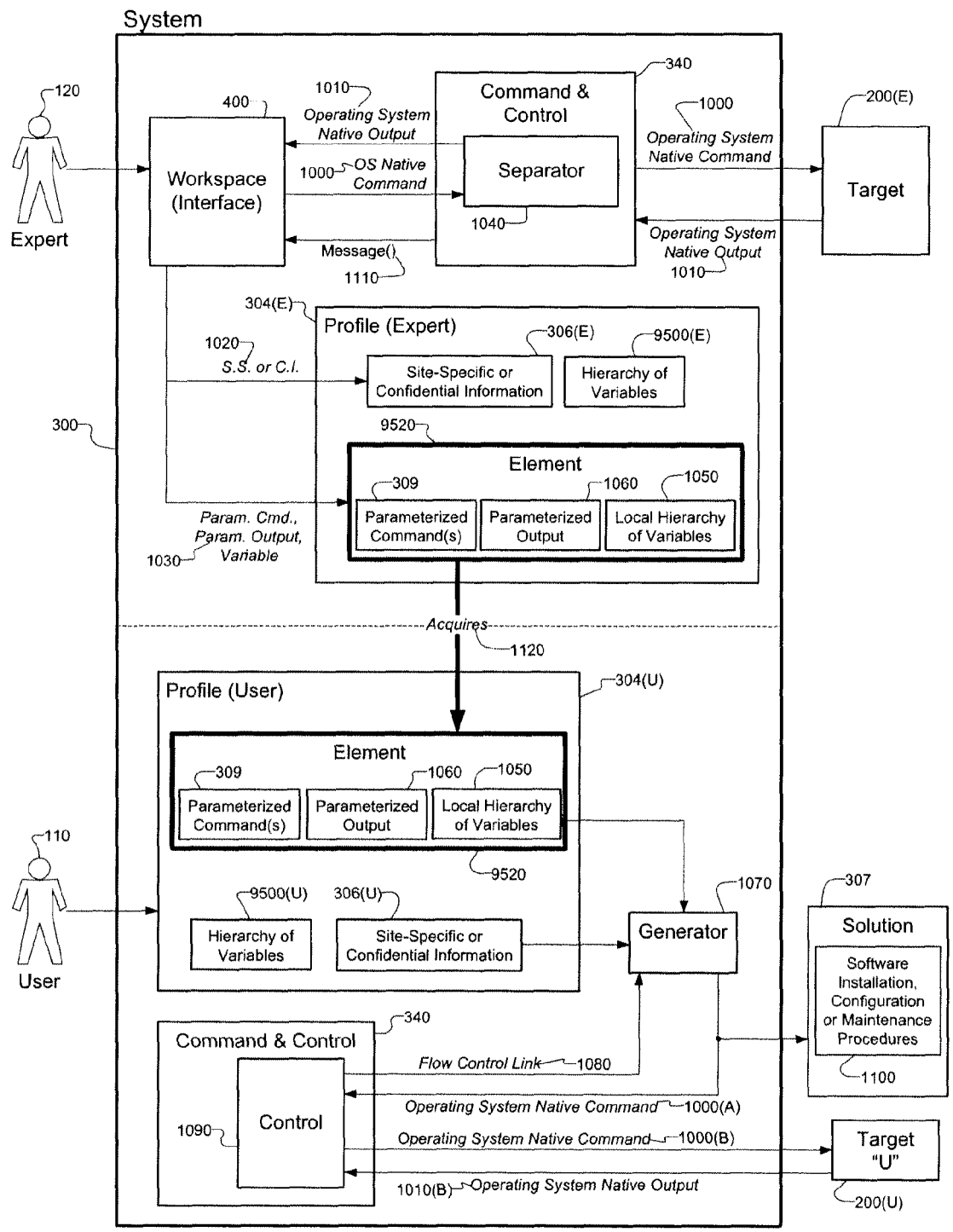
FIG. 1 is a process diagram showing an example embodiment of the present invention.

FIG. 1 shows a flow diagram of one embodiment of an example system of the present invention. The System 300 provides a way for an Expert 120 to define one or more Elements 9520, which are objects containing a set of Parameterized Commands for software installation instructions; Parameterized Outputs 1060 for showing expected outputs resulting from the execution of a Parameterized Command; and, a Local Hierarchy of Variables 1050 for replacing Site-Specific or Confidential Information 306(E). Furthermore, the System 300 provides a way for a User 110 to Acquire 1120 Elements 9520 created by others and apply the User's own Site-Specific or Confidential Information 306(U) to generate a Solution 307 which contains the Software Installation Configuration or Maintenance Procedures 1100 specific to a User's environment, containing confidential information such as passwords and company data and site-specific information such as network settings.

This Site-Specific or Confidential Information 306 is preferably stored in a secure manner where a User 110 or Expert 120 only has access to his own Site-Specific or Confidential Information.

According to one embodiment, an Expert 120 includes someone with technical skills and knowledge who uses the System 300 to access a Target 200(E) computing system, where the Target may be a remote system accessed over a network, a host computing system accessed through a console, netcat, Telnet, SSH or similar login, or a virtual environment such as a guest operating system running on the host computing system accessed through a connection over a virtual network or through a hypervisor application used to create the virtual environment.

The Expert 120 uses a Workspace 400 interface provided by the System 300 to access the Target 200(E) via a Separator 1040 software application. The Separator 1040 application identifies the context of an Operating System Native Command 1000 issued by the Expert 120 or Operating System Native Output 1010 returned from the Target 200(E) and redacts Site-Specific or Confidential Information 306.

Figure 2:
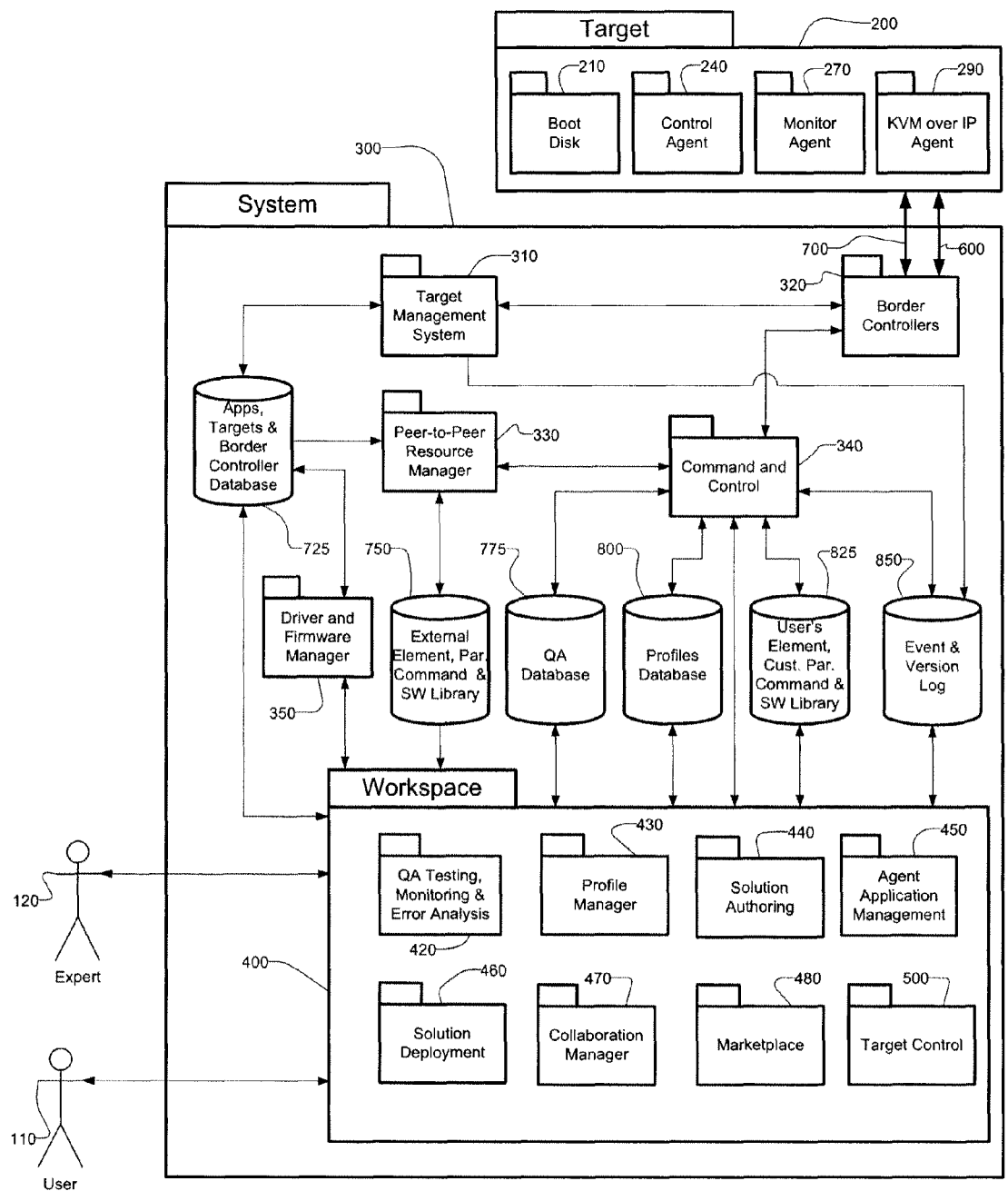
FIG. 2 is a system diagram showing an example embodiment of the present invention.

The Separator 1040 application may execute on the Command and Control 340 server shown on the system diagram of FIG. 2. As shown on FIG. 1 and FIG. 2, the Command and Control 340 interfaces with the Workspace 400 and delivers the results of the Separator 1040 in a Message 1110 to the Workspace 400. The Message 1110 may include such information as the Site-Specific or Confidential Information that was redacted from the Operating System Native Command 1000 and Operating System Native Output 1010 as well as the corresponding, parsed instructions or output. The Workspace 400 delivers these messages to the Expert's Profile 304(E): the Site-Specific or Confidential Information 1020 (shown as "S.S. or C.I." 1020 in FIG. 1) is stored in the Site-Specific or Confidential Information 306(E) data structure or flat-file; and, the Parameterized Command, Parameterized Output and Variable (shown as "Param. Cmd., Param. Output, Variable" 1030) are stored in the set of Parameterized Commands, Parameterized Output 1060 and Local Hierarchy of Variables 1050, respectively, within the Element 9520 being defined.

The Workspace 400 provides the Expert 120 with the ability to define new variables and place them into a Hierarchy of Variables 9500(E) within the Expert's Profile 304(E). The Workspace 400 may also automatically update the values of variables existing in a Hierarchy 9500 by using the context of the Operating System Native Command 1000 and the results shown in the Operating System Native Output 1010. For example, if the Expert 120 issues a command to change a network IP setting, such as assigning the Target 200(E) a new IP address, then Operating System Native Command will be recognized by the Workspace as one that updates an existing value in a Hierarchy of Variables 9500(E) and will update the Site-Specific or Confidential Information 306(E) entry accordingly.

In reference to FIG. 1, the redacted Site-Specific or Confidential Information 1020 is used to create the structure of a Local Hierarchy of Variables 1050 within an Element 9520 and update the Site-Specific or Confidential Information 306 values within a Profile 304(E) belonging to the Expert 120. As the Expert 120 defines a Local Hierarchy of Variables 1050 within an Element 9520, the corresponding Hierarchy of Variables 9500(E) within the Expert's Profile is also updated so that a Local Hierarchy of Variables 1050 within an Element 9520 is always an up-to-date subset of the Hierarchy of Variables 9500(E) in a Profile 304(E).

In reference to FIG. 1, a User 110 includes someone who requires an IT Solution 307 and has physical access to one or more Targets 200(U) on which to perform actions such as inserting a CD-ROM and powering on the device. The Target 200(U) may comprise a remote system accessed over a network, a host computing system accessed through a console, netcat, Telnet, SSH or similar login, or a virtual environment such as a guest operating system running on the host computing system accessed through a connection over a virtual network or through a hypervisor application used to create the virtual environment.

According to one embodiment and as shown in FIG. 1, a User 110 maintains an independent Profile 304(U) containing the User's Site-Specific or Confidential Information 306(U) and a Hierarchy of Variables 9500(U).

In one embodiment of the System, a User 110 creates, modifies or updates the Hierarchy of Variables 9500(U) using a Profile Manager interface provided by the System 300 through a Workspace 400 interface. In addition, the System may extract Site-Specific or Confidential Information 306 directly from a Target 200(U) or a Target's network environment by automatically deploying an analysis software utility to identify Site-Specific or Confidential Information such as network parameters, hardware components, software components, etc. This automated analysis may be used to create the structure of the Hierarchy of Variables 9500(U) and specify the corresponding values in the Site-Specific or Confidential Information 306(U) database or file.

In reference to FIG. 1, a User 110 may Acquire 1120 an Element 9520 from an Expert 120. (In another embodiment of the System, the User 110 may also create an Element 9520, in which case the User 110 would be considered an Expert 120.) When a User 110 Acquires 1120 an Element 9520, only the set of Parameterized Commands, Parameterized Output 1060 and Local Hierarchy of Variables 1050 are transferred; the Site-Specific or Confidential Information or complete Hierarchy of Variables 9500 are never transferred between Users 110 and Experts 120. The Local Hierarchy of Variables 1050 may be merged with the Hierarchy of Variables 9500(U) existing in the Profile 304(U) of the User 110.

A Generator 1070 software application is used to apply the Site-Specific or Confidential Information 306U contained in a Profile 304U of a specific User 110 to the set of Parameterized Commands in an Element 9520 which may have been acquired from an Expert 120. The Generator 1070 identifies any missing, inconsistent or incorrect values for variables and provides a way for the User 110 to fix or update these values.

The Generator 1070 can create an application, script or textual representation of a Solution 307 which contains software installation, configuration or maintenance procedures where these procedures contain Operating System Native Commands 1000(A). This representation is shown in FIG. 1 as Software Installation, Configuration or Maintenance Procedures 1100.

A Control 1090 application, which may execute within the Command and Control 340 component, processes the Operating System Native Commands 1000(A) from the Generator 1070, issues Operating System Native Commands 1000(B) to the Target 200(U) and uses the Operating System Native Output 1010(B) from a Target 200(U) to determine the Flow Control Link 1080 of command execution.

1.1. Solutions

According to one aspect of the present invention, a Solution comprises the System applying Site-Specific or Confidential Information to one or more Elements to define the installation, configuration or maintenance procedures for one or more software applications on one or more Targets. A Solution is a user- and site-specific instance of one or more Elements, where the variables in each Element's Local Hierarchy of Variables are specified by in the Site-Specific or Confidential Information stored in a User's Profile.

For example, a Solution 307 may include commands to compile a Linux Kernel using parameters specific to a Target's hardware; compile and customize an Apache web server; compile and customize databases such as MySql and utilities such as PHP; and, install a CRM/ERP software application such as Compiere. All of these applications may be defined by individual Elements, where the arrangement of Elements in a Hierarchy defines their installation sequence.

These applications may be installed from source code, but the Solution 307 may also include commands to download and install pre-compiled, executable programs. In addition to using the System to create an Element, an Expert may also maintain an Element so as to update it with software fixes and improvements. It is desirable for such updates to be applied to Targets after the Solution is already deployed.

1.2. Connecting Target to System

In one embodiment, the System provides a way for the User to connect one or more Targets to the System using a Control Agent application to establish an operative connection between the Target 200 and the System 300 over a network. The Control Agent application may be combined with a Boot Disk in order to initialize the Target before connecting the Target to the System.

Once the Control Agent connects the Target to the System, the System may control the Target for the purposes of deploying a Solution to the Target; or, the System may monitor the Target to measure the Target's performance or for another purposes. A User may use the same Boot Disk to boot multiple Targets, where each Target is connected to the System and is accessible by the User.

1.3. Deploying Solutions to Targets

In one aspect of the present invention, the System issues commands to the Target to install, configure or maintain a Solution. The Solution may be compiled on the Target itself from source code, installed from a pre-compiled image, or be a self-contained executable file. The source code, image, or file may be transferred to the Target from the User's Element, Custom Parameterized Command and Software Library, an External Element, Parameterized Command and Software Library, or from any location external to the System such as a file repository accessible over a data network, e.g., SourceForge.Net.

A Solution need not be installed on the Target. Instead, an executable file may be downloaded to the Target and executed without performing any traditional software installation steps. For example, a network analysis utility may be a self-contained, executable file that is downloaded to the Target, executed and run from memory without storage to the Target's hard drive.

2. Target Initialization and Connection

In reference to FIG. 2, the System 300 preferably generates and uses software applications to initialize and connect the Target 200 to the System 300. These applications include, but are not limited to, Boot Disk 210, Control Agent 240 and Monitor Agent 270. The System 300 may also use 3rd party, proprietary KVM-over-IP devices to connect the Targets 200; these devices may be called KVM over IP Agents 290. While each of these different clients may be combined to form one multi-function client, for the purposes of describing the functionality these clients will be considered separately.

2.1. Control Agent

In one aspect of the present invention, the Control Agent is used to establish a Communication Link between two or more computing devices or systems, such as Targets and a Border Controller. The Control Agent may incorporate an SSH, VNC, X11 or Microsoft Windows Terminal server or another type of software application that allows remote access. One advantage of the Control Agent is that it functions to provide system-level control of the Target from a remote location.

2.2. Boot Disk

Figure 3:
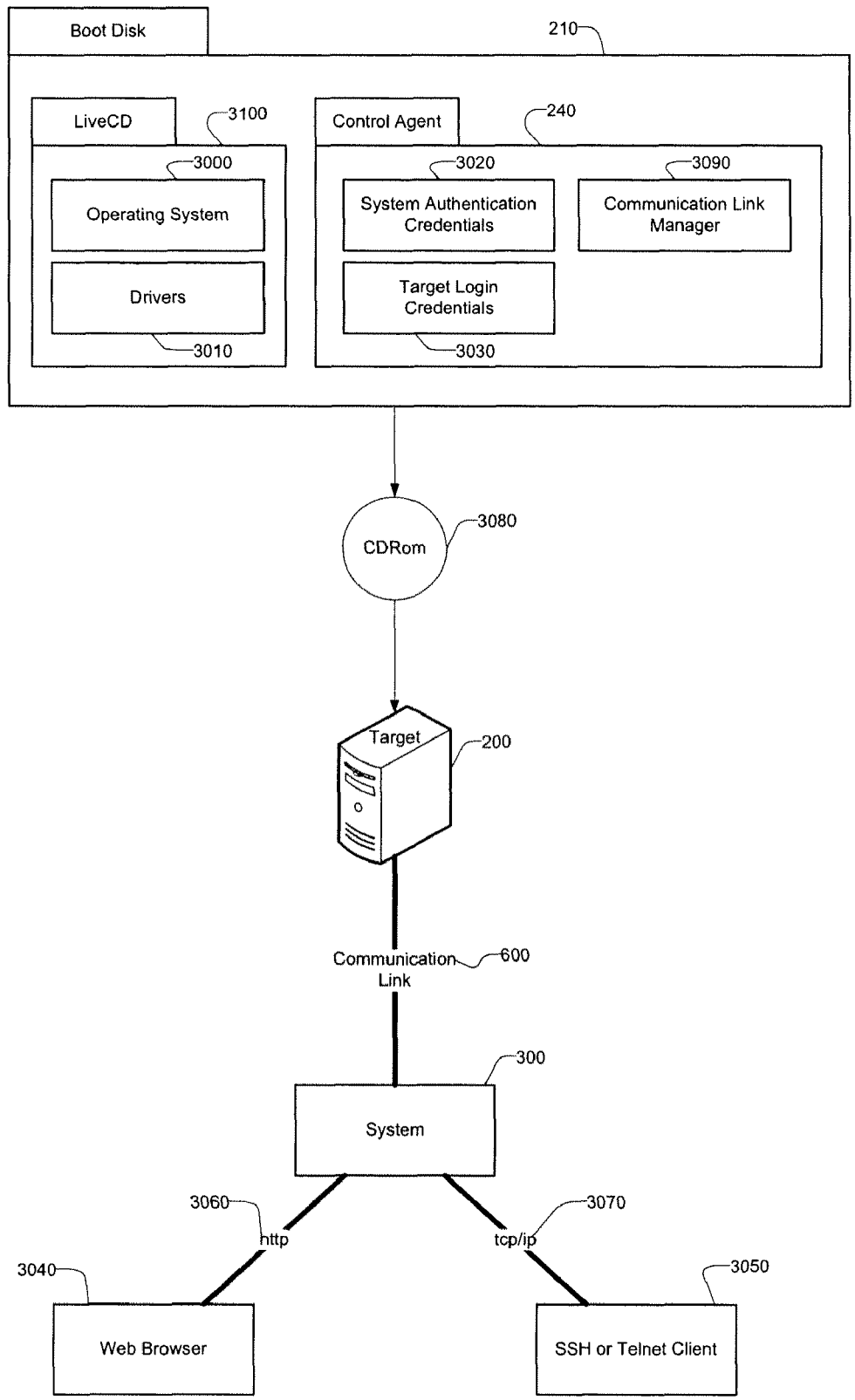
FIG. 3 is a block diagram showing an example embodiment of a boot disk with control agent software application according to one aspect of the present invention.

In reference to FIG. 3, it may be desirable for the Control Agent 240 to be incorporated into a Boot Disk 210. Examples of Boot Disks that may be used are Floppy disks, CD-ROMs, DVD disks, USB Flash Drives, external Hard Drives and network-mounted boot disks accessible through HTTP, BOOTP, FTP, or TFTP and similar protocols and located on a server used for network booting. In the case where the Boot Disk 210 is in the form of a CD-ROM 3080, the User inserts the CD-ROM 3080 into the Target 200 and applies power to boot the Target.

The Agent Application Management 450 subsystem shown in FIG. 2 creates Control Agents 240 specific to each User 110 or Expert 120. This subsystem incorporates user-specific information into the Control Agent 240 such as System Authentication Credentials 3020 used in a Signaling Link and Target Login Credentials 3030 to allow logging into the Target, as shown in FIG. 3. The System Authentication Credentials 3020 would be known only to the System 300 and not to the User and be such information as the administrator (or root) password and security keys such as RSA authentication key pairs. User access to the Target 200 may also be permitted using the Target Login Credentials 3030. This information may be stored in an encrypted form in the Control Agent 240.

The Boot Disk 210 includes an Operating System 3000 that will be used to initialize the Target 200. In one embodiment, the Boot Disk 210 may incorporate a LiveCD 3100 that is derived from a Linux operating system and include Drivers 3010 necessary to initialize a Target's 200 components such as a network interface card, storage controllers, peripheral devices attached to the Target and the like.

2.3. Monitor Agent

The Control Agent may be replaced by a Monitor Agent when desired. For instance, the Control Agent will be replaced with a Monitor Agent when there is no longer a requirement for the System to execute commands on the Target. In such a case, the Monitor Agent sends Target-specific information to the System 300 but does not allow external access. Thereafter, the Monitor Agent may use the Signaling Link to relay this status information. The replacement of the Control Agent with the Monitor Agent may be done for security and performance reasons. That is, the Monitor Agent is not vulnerable to intrusion as it lacks a mechanism for remote login. Moreover, it is a simpler application that requires fewer Target resources, such as RAM or CPU.

In another embodiment, the Monitor Agent may be installed on a functioning computer system independently of the Control Agent. This allows a User or Expert to connect that computer to the System for monitoring when full control is not immediately required.

It is desirable for the Monitor Agent's functionality to be configured by the User or Expert. For example, the Monitor Agent may be used to monitor network activity, hardware performance, virus monitoring, software patch monitoring and the like. The User or Expert selects the desired functionality using the Workspace prior to installing the Monitor Agent (either independently or in transition from the Control Agent.)

Additionally, the Monitor Agent may have the capability to re-activate the Control Agent if that functionality is originally enabled in the Workspace. In such a situation, the Monitor Agent will activate the Control Agent, which will attempt to re-estblish a Communication Link in a manner that is described elsewhere in this disclosure.

2.4. KVM Over IP Client

Several hardware manufacturers offer a KVM over IP product that can be incorporated into a computer's system board or network interface card, or externally connected to the computer's keyboard, mouse and video ports. This KVM over IP device allows a remote user to access that computer over a network. The IPMI interface is one example of a KVM over IP functionality.

To take advantage of KVM over IP products known to those skilled in the art, the present invention allows the System to be configured to use a commercial KVM over IP product as the remote client. This KVM over IP Agent may be similar to and replace the Control Agent. However the Border Controller would require a matching interface that would be specific to each vendor's KVM over IP product. Likewise the Communication Link may use a different protocol to connect and communicate with the KVM over IP Agent. This protocol may be proprietary to the vendor. An advantage of the KVM over IP Agent is that it would allow access to a target's BIOS settings.

Since the KVM over IP Agent will not have the notification/response functionality of the Control Agent, the System is preferably configured with the Target's IP address. However, in one aspect the KVM over IP Agent can be used in combination with the Monitor Agent to allow the System to automatically discover the Target and connect to the KVM over IP Agent.

2.5. Signaling and Communication Links

Figure 4:
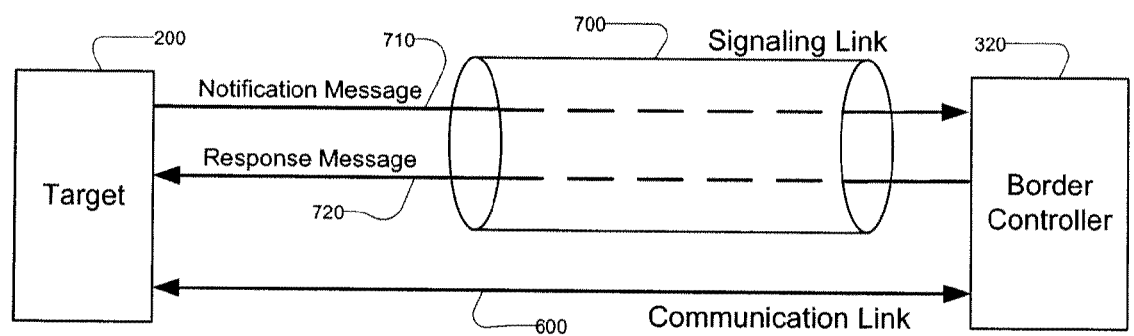
FIG. 4 is a diagram showing communication between a target and a border controller according to one aspect of the present invention.

In reference to FIG. 3 and FIG. 4, after the Boot Disk 210 initializes the Target 200, in one embodiment the Control Agent 240 uses a Signaling Link 700 to request a connection with the System 300. This connection request may be sent using the Communication Link Manager 3090, which retrieves the System Authentication Credentials 3020 stored in the Control Agent 240 and sends a Notification Message 710 to a remote server specially programmed to authenticate and accept such requests. The Border Controller 320 is one such server and is described herein. This Notification Message 710 may be in the form of a UDP or TCP packet, Java RMI, CORBA, SOAP or Session Initiation Protocol (or SIP) signal, HTTP method such as GET, WGET, XML request or SSH remote execution command, or any similar protocol that may be used for signaling.

If the connection request is accepted by the System 300, the Control Agent 240 may be used to establish a secure connection called a Communication Link 600. If the connection is refused or an error occurs, the Control Agent 240 may attempt to notify another Border Controller 320, wait and re-attempt to contact the same Border Controller 320, or inform the User that a problem has occurred.

A Notification Message 710 may receive a "redirection" as a Response Message 720 in situations where the System 300 attempts to evenly distribute Border Controller 320 resources to prevent any one Border Controller 320 from handling more Communication Links 600 than its resources would permit. Instead of accepting a Notification Message 710 request, the "redirection" Response Message 720 will instruct the Control Agent 240 that it should attempt to establish a connection with another Border Controller and provide that Border Controller's connection parameters such as IP address, port and security key. The Control Agent 240 begins the process of establishing a connection to the new Border Controller 320 in the same manner described above.

The Signaling Link 700 may also be used to provide an independent connection to the System 300 after the Communication Link 600 is established. This connection may be used for "heartbeat" or "keep alive" messages to independently notify the System 300 of the Target 200's condition.

2.6. Techniques to Assign Remote-Forward Port Number to Target

To establish a Communication Link from the System to the Target, three SSH techniques are combined into a novel method: (i) SSH is used to execute a remote program on the Border Controller to authenticate the Target and assign the Target a unique Remote-Forward port number and a temporary authentication token; (ii) SSH is then used to establish a tunnel connection from the Target to the Border Controller, where the Target 200 is configured to use a previously-assigned Remote-Forward port; and, (iii) an SSH Gateway-Port is established on the Border Controller and used by external applications, such as Telnet, to connect to a desired Target 200 by using its unique Gateway-Forward port number on the Border Controller. In another embodiment, an application running on the Border Controller may connect to the Border Controller (for example, on localhost) using the Remote-Forward Port as the means to connect to the desired Target.

Figure 5:
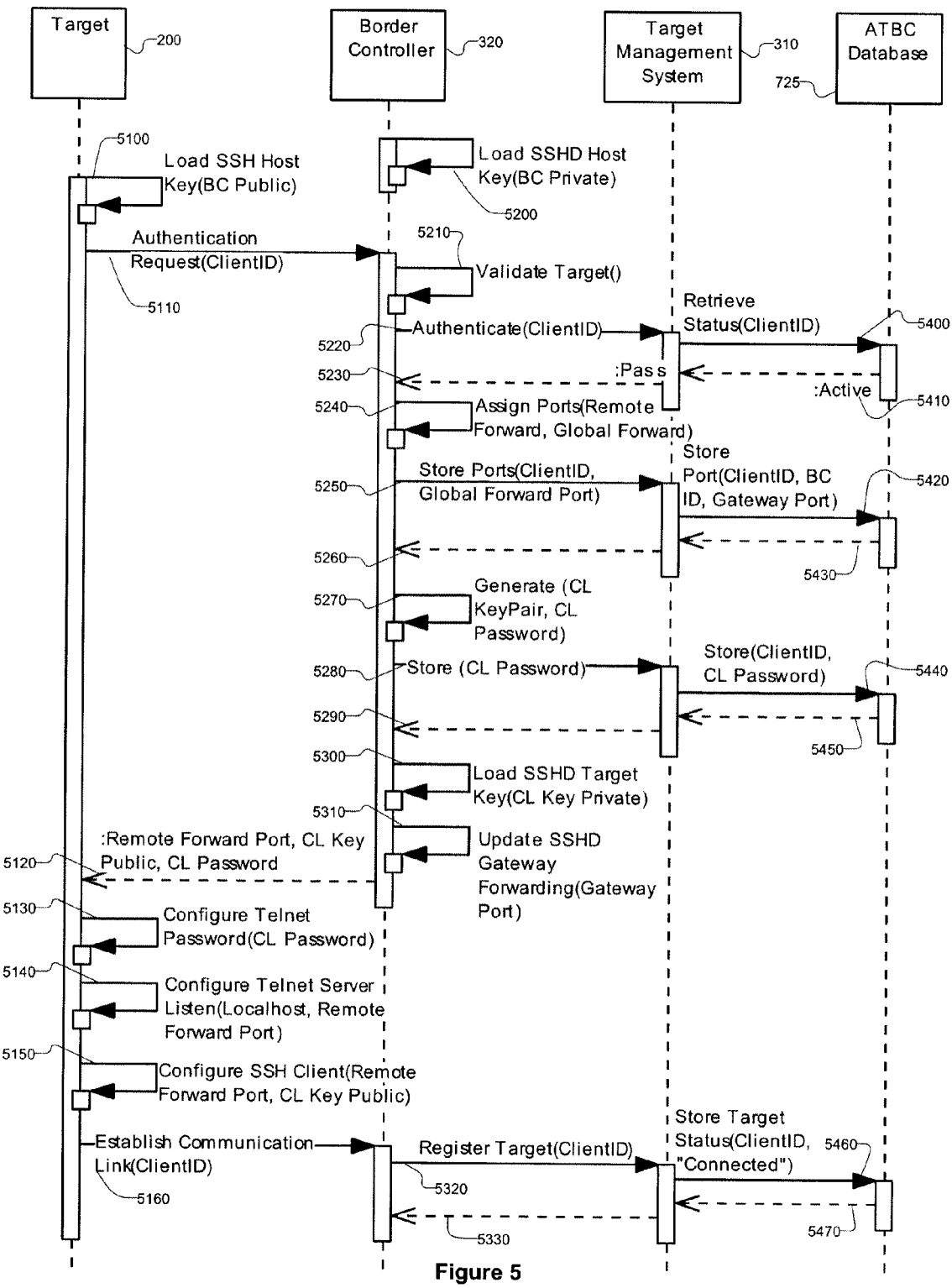
FIG. 5 is a sequence diagram showing messaging to assign remote forwarding ports to a target in one embodiment of the present invention.

One example of how this technique may be applied is shown in FIG. 5. In this example, the Border Controller is running an SSH server application such as "sshd" with a private authentication key "BC Private" as shown in step 5200. The Target configures an SSH client to use a Border Controller's public key for signaling as shown in step 5100 and executes a remote program on the Border Controller using "AuthenticationRequest(ClientID)" message 5110, which sends the Target's unique identifier, "ClientID," as a parameter. The Border Controller executes the remote program in step 5210 to validate the ClientID.

The steps 5110, 5210-5310 and 5120 would comprise the Signaling Link described herein and is used to authenticate the Target prior to establishing a Communication Link. In step 5210, the Target is authenticated using the BC Public key previously loaded. In step 5220, the ClientID is validated through the Target Management System 310, which queries the ATBC Database 725 in step 5400 and receives a response, such as "Active" as illustrated in step 5410. The Target Management System 310 responds with "Pass" to the Border Controller 320 in step 5230, resulting in the Border Controller 320 assigning the Remote-Forward and Global-Forward ports in step 5240. These port assignments are sent to the Target Management System 310 in step 5250 which stores the ports in the ATBC Database 725 in step 5420. Steps 5430 and 5260 indicate that the port assignments have been written to the database successfully. The Border Controller 320 generates Communication Link Credentials and Communication Link Login Credentials in step 5270, which are referred to as "CL Keypair" and "CL Password", respectively. The Communication Link Login Credentials is sent to the Target Management System 310 in step 5280 which stores the information in the ATBC Database 725 in step 5440. Response messages 5450 and 5290 indicate that the information was stored successfully. The Border Controller 320 prepares itself for the Communication Link by loading private portion of CL Key in step 5300, updates the SSH daemon's Gateway-Forward port assignment in step 5310 and finally provides the response message 5120 containing the Communication Link Key that will be used to establish a tunnel from the Target 200 to the Border Controller 320 and the Communication Link Password that will be used to log into the Target.

The Target Login Credentials 3030 referenced in FIG. 3, and discussed elsewhere, may be used to store the login credentials with the Control Agent 240. In the discussion above, step 5270 is used to generate login credentials just prior to establishing a Communication Link. Both embodiments may be used to implement Target login. As those skilled in the art will recognize, these login credentials may be implemented through public and private keypairs as well as standard password techniques.

There may be different responses to AuthenticationRequest message 5110, such as "fail", "redirect", "wait" and "OK". In the example shown in FIG. 5, response message 5120 illustrates the result of an "OK" response.

The Target 200 uses Telnet for incoming connections, as shown in step 5130. Other remote server applications such as SSH, rlogin, etc., may also be used as desired by those skilled in the art. For security purposes, these applications would be preferably configured to accept connections from "localhost" only, as shown in step 5140.

To establish the Communication Link, the Target 200 in step 5150 configures an SSH client to use the public-key portion of "CL Key Public" and the Remote Forward port previously assigned and connects to the Border Controller 320 using the same port number as was used for the Signaling Link 700, as shown in step 5160. Once the Communication Link 600 is established, the Target's 200 status is updated in the Target Management System 310 to allow external applications to locate the Target 200, as shown in step 5320 and 5460.

One external application may be the Command and Control system, which uses the Target Management System to obtain the IP address and port number of the Border Controller which is acting as the gateway to the Target. Using this IP address and port number, the Command and Control system connects to the Border Controller using a Telnet client. (As mentioned previously, Telnet is only one of several applications that may be used.) The Border Controller now functions as a gateway to the Target, forwarding the TCP/IP communication from the Command and Control system to the specific Target. Applications running on the Command and Control system, such as the Separator 1040 and Control 1090 show in FIG. 1 may now execute Operating System Native Commands on the Target and receive Operating System Native Output.

The previous example is intended to described one embodiment of the technique of the present invention. Skilled artisans will recognize that other extensions and modifications to this technique are possible. For example, instead of using SSH to establish the Tunnel connection, other encrypted and unencrypted network connections may be possible. One alternative is "netcat," the network connection protocol and its variations such as "cryptcat" and "SoCat." Use of "netcat" to implement "reverse Telnet" are well documented in the IT field and by those skilled in the art.

Likewise, skilled artisans will recognize that components shown in the system diagram of FIG. 2 may be deployed on a single server, virtual server or distributed across different physical locations. For example, multiple Border Controllers 320 may be located in different locations from the other components of the System 300 and connected over a digital network.

2.7. Firewall Traversal Technique

Figure 6:
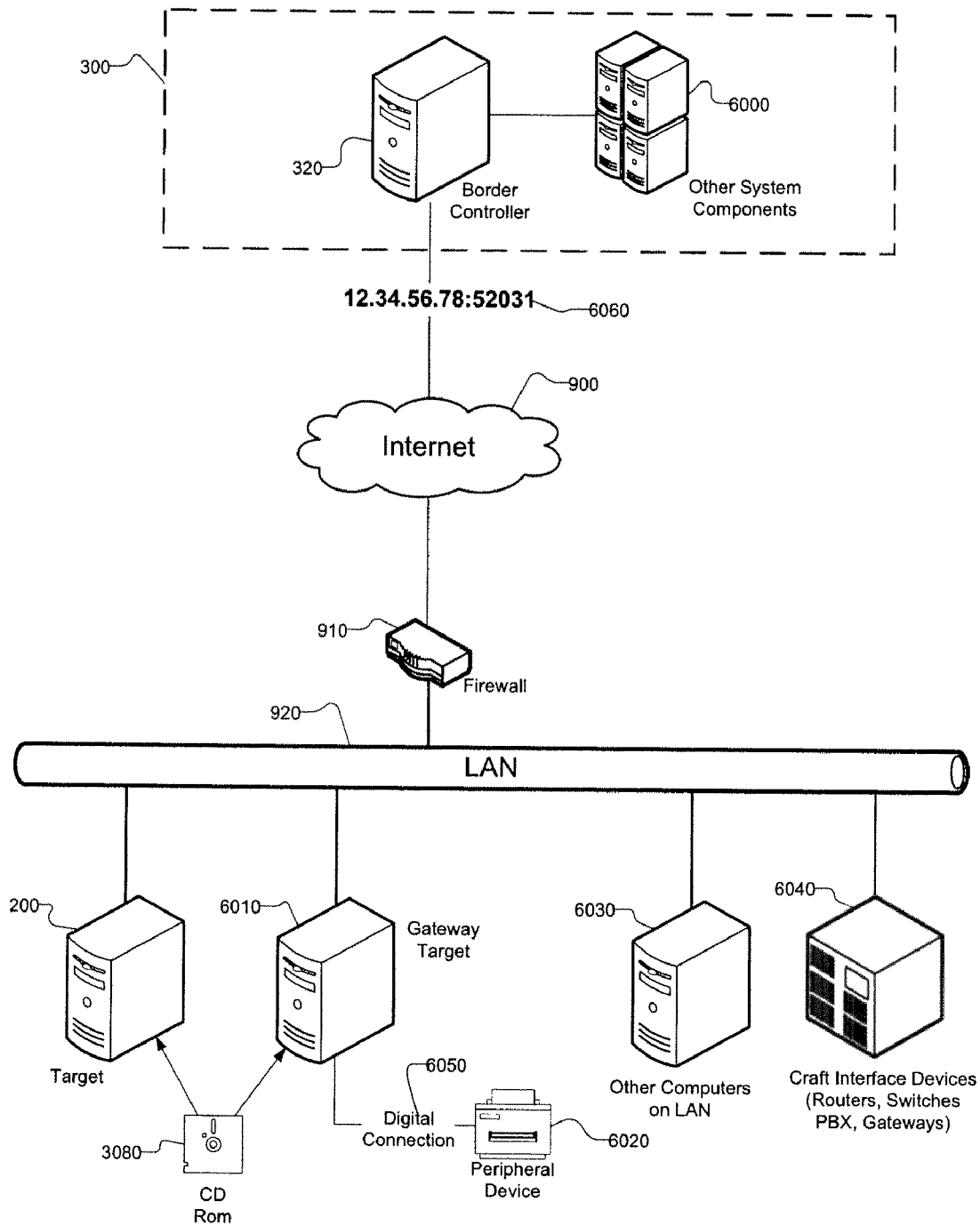
FIG. 6 is a deployment diagram showing an embodiment of the system of the present invention.

According to one embodiment and in reference to FIG. 4 and FIG. 6, a Notification Message 710 is sent from a Target 200 to a pre-defined and randomly selected Border Controller 320. Besides notifying the System 300 that the Target 200 requests a connection, this Notification Message 710 is used to activate port forwarding on any Firewalls 910 that may reside between the Target 200 and the public network, such as the Internet 900, used to reach the System 300. After the Signaling Link 700 is used to authenticate the Target 200, the Communication Link 600 is established to the same IP Address and Port 6060 used in the signaling process, thereby minimizing the likelihood that connections from the Target 200 to the System 300 will be blocked by a Firewall 910. In other embodiments, however, different IP Addresses and Ports may be employed.

Some Firewalls 910 may restrict outbound access from the LAN 920 to only specific ports, such as those ports used for Web browsing over the HTTP protocol. The HTTP protocol uses port 80 and Firewalls 910 typically permit outbound access from the LAN 920 on this Port. In such situations, the Signaling Link 700 and Communication Link 600 may use Port 80.

2.8. Network Booting

Network booting is a capability present in most modern network interface cards and motherboards. It allows for lower-cost computing devices by eliminating storage costs, which are sometimes significant. For Targets 200 that lack a storage device such as a hard drive, the Border Controller 320 may provide network booting services to allow those Targets 200 to obtain the Control Agent directly from the System 300. Network booting is a standard, well documented procedure and is well known to those skilled in the art.

2.9. Target Management System

According to one aspect, the Target Management System provides monitoring and management of each Border Controller to gauge its utilization and performance. The Target Management System can move Targets between Border Controllers to provide for Border Controller shutdown or maintenance, load balancing and network performance improvements.

When there are many Targets connected to the System, it is advantageous to connect Targets to the Border Controller that has the shortest network path or latency. Border Controllers may be located in different regions and have different paths or latency to different Targets. Therefore the latency between one Target and its Border Controller may be higher than the expected latency between that Target and a Border Controller located in closer proximity (e.g. a Border Controller with fewer network hops).

In one embodiment, the Target Management System monitors network latency between Border Controllers and Targets using information collected from the Control Agent and Monitor Agent. The Target Management System may instruct these clients to measure latency to other Border Controllers and then re-assign the Target to a different Border Controller to optimize network performance (e.g. minimize latency).

To prevent disrupting an active Communication Link, a Target's reassignment to a new Border Controller may occur in a "make before break" manner where the Target first initiates a new Communication Link with the new Border Controller before terminating the existing Communication Link with its current Border Controller.

2.10. Security Methods

One embodiment of the present invention allows the Target Management System to assign each Border Controller a random set of ports on which to accept network traffic. This set of ports may be different for each Control Agent. These port assignments are preferably known to only the Control Agents assigned to that Border Controller and optionally to the Target Management System.

It may be useful to prevent unauthorized attempts to access a particular system. For instance, attempts to access the Border Controller on a disallowed port may be construed as a hacking attempt and the Target Management System may block the hacker's IP address from accessing any Border Controller. Furthermore, the Target is generally expected to connect using an assigned port; access using an unassigned port may also be construed as a hacking attempt and denied.

The Target is secured from outside intrusion by limiting access to the SSH, VNC, or other remote desktop server such that any server running on the Target is only allowed to connect using an internal IP address, such as that defined by "localhost."

2.11. Target as Gateway to Other Targets

The System may configure a Target to function as a gateway to other Targets located on the same local area network using an example procedure described below. This procedure would allow multiple Targets located on the same network to use a single Gateway Target for communication with the System.

As illustrated in FIG. 6, a Target 200 is connected to the System 300 using a Boot Disk CD-ROM 3080 as described previously. A Communication Link is used to configure this Target 200 into a gateway device by installing on the Target the necessary analysis and server software.

Analysis software may include network analysis tools that can be used to identify other computing devices on the local area network as well as analyze the network to identify IP addresses, subnets, VLANs, gateways, routers, switches and other network elements.

Server software may include software to deliver a bootable operating system to computing devices; Telnet clients, SSH clients or similar software applications; software applications similar to that of a Border Controller 320; and, network utilities such as Wake-on-LAN packet generators.

Once configured, the Target 200 may be considered to be a Gateway Target 6010.

Connecting a computing device to the Gateway Target 6010 can be accomplished in several ways: The Gateway Target 6010 may be configured into a boot server and boot the Other Computers on LAN 6030 with an operating system and control application similar to a Control Agent; the Other Computers on LAN 6030 may themselves be booted with a Boot Disk containing the Control Agent; or, the Gateway Target 6010 may log into Other Computers on LAN 6030 or Craft Interface Devices 6040 using Telnet, SSH or the like using an administrator-level user account. When booting the Other Computers on LAN 6030 via a Control Agent, the Gateway Target 6010 may be listed as one of the Border Controller devices to which these computers will attempt to establish a Communication Link and the Gateway Target 6010 may be configured to execute a software application to accept the Communication Link.

Once connected, the Other Computers on LAN 6030 and Craft Interface Devices 6040 become a secondary-Target that communications with the System 300 through the Gateway Target 6010. The secondary-Target can be controlled and configured as any other Target using the techniques described in this disclosure.

The approach described here may be repeated so that a secondary-Target may be configured as a secondary-Gateway Target and used to connect tertiary-Targets and so forth.

2.12. Target as Gateway to Peripherals and Craft Interface Devices

According to one embodiment, a User's IT environment may include one or more components. These components may include, but are not limited to, peripherals such as USB or Firewire devices and network devices such as routers, switches, network attached storage devices and the like. Each of these components may have its own configuration requirements. For example, a network-attached storage device may need to be configured with a site's domain, user accounts and share permissions.

In reference to FIG. 6, a Gateway Target 6010 may be used to operatively connect components located on the same LAN 920 or connected to the Gateway Target 6010 by USB, Firewire or some other Digital Connection 6050.

One way to connect these components to the System 300 is to configure the Gateway Target 6010 as an extension of the System 300 in order to extend the reach of the Border Controller 320 into the LAN 920. Accordingly, the System 300 operatively connects to the Gateway Target 6010 using the methods described elsewhere. Once connected, an analysis application may be installed on the Gateway Target 6010 to detect Peripheral Devices 6020.

For Peripheral Devices 6020 attached to the Target 6010, the connection from the Target 6010 to the Peripheral Device 6020 may be established through a software driver loaded into the operating system or a special application designed to recognize and communicate with the Peripheral Device 6020.

For Craft Interface Devices 6040, which typically have a proprietary command line interface, the operative connection to the network devices may be accomplished using standard network protocols such as Telnet, SSH, VNC, rlogin, Netcat, HTTP and others. For example, to connect to a Cisco Router or IP Telephone the Gateway Target 6010 may use Telnet and relay the commands from the System 300 to the device. The System 300 may contain an interpreter necessary to connect a GUI, such as the Workspace, to the proprietary command line interface of the Craft Interface Device 6040.

After establishing this gateway connection to the component, the System 300 may conduct diagnostic analysis and testing on that component. For example, if a firewall device is suspected of failing, the device vendor may distribute a Boot Disk in the form of a CD-ROM 3080 to the customer. The customer uses the CD-ROM 3080 to establish a gateway connection from the Gateway Target 6010 to the System 300 and then establish another connection to the Peripheral Device 6020 or Craft Interface Device 6040 which then allows the vendor to perform testing on the device. This testing and analysis of devices may be automated to allow hardware and/or software vendors to troubleshoot devices already deployed in the field.

3. System Components

FIG. 2 shows one embodiment of the System 300. As those skilled in the art will recognize, the components described here may be deployed on a single server or multiple servers connected over a local or wide area network. In another embodiment, the Workspace 400, Separator 1040 and Generator 1070 may also be deployed as a software application on a Target to allow a computing system to issue commands to itself for Solution Authoring or Solution Deployment.

3.1. Target Control

According to one aspect of the present invention, Target Control 500 shown in FIG. 2 is a Workspace 400 component that maintains a list of Targets 200 connected to the System 300 for each User 110 or Expert 120. Target Control 500 provides a way for a User 110 or Expert 120 to connect to a desired Target 200 and issue Operating System Native Commands, Parameterized Commands and Instructions that reference Variables in a Hierarchy. In one embodiment, Target Control 500 may execute the Generator 1070 software application shown in FIG. 1 to provide a real-time conversion of Parameterized Commands entered into the Workspace 400 into Operating System Native Commands that are executed on the Target 200.

As a User 110 or Expert 120 enters Parameterized Commands in the Workspace 400, the Target Control 500 component retrieves the Site-Specific or Confidential Information stored in the Profile 304, applies it to the Parameterized Command and issues the Operating System Native Command to the Command and Control 340 component. The Command and Control 340 component then relays these commands to the Targets 200 via a Border Controller 320.

For example, a User may wish to shut down certain Targets. Instead of logging into each Target, the User selects the desired Targets on the Workspace. Acting on all Targets, the User issues a "shutdown" Parameterized Command. The Target Control component retrieves the Site-Specific or Confidential Information such as the Target's IP address and root password (which may be different for each Target) and forwards the commands to the Command and Control component. The Command and Control component identifies the Border Controller connecting the Target and logs into each Target using this Border Controller as the gateway. On each Target, the shutdown sequence is executed: this sequence may include acquiring administrator permissions by entering the root password and issuing the "shut down" command.

3.2. ATBC Database

In one embodiment, the Apps, Targets and Border Controller Database 725 shown in FIG. 2 is used by the Target Management System 310 and Workspace 400 to maintain information about Boot Disks 210, Control Agents 240, Monitor Agents 270, and Targets 200 belonging to a User 110 or Expert 120, as well as the Border Controllers 320 to which the Control Agents 240 are assigned and the IP addresses and gateway forwarding ports on the Border Controllers used to log into Targets 200. The use of the Border Controller for gateway forwarding is described elsewhere.

3.3. Workspace

It is desirable for the System 300 to provide the User 110 with a web-based interface called the Workspace 400, as shown in FIG. 2. Examples of possible interfaces are shown in FIG. 8, FIG. 11, FIG. 12 and FIG. 13. The Workspace 400 contains components that augment the functionality of the interface, such as: QA Testing, Monitoring and Error Analysis 420 to provide diagnostics used during Solution deployments to Targets; Profile Manager 430 to allow User 110 and Expert 120 to maintain a Hierarchy of Variables, Elements and Site-Specific or Confidential Information; Solution Authoring 440 that provides a way to create Elements; Agent Application Management 450 which allows a User 110 or Expert 120 to create and maintain Boot Disks 210, Control Agents 240, Monitor Agents 270 and KVM over IP Agents 290; Solution Deployment 460 which provides workflow processing to apply Site-Specific or Confidential Information to one or more Elements for the purposes of compiling a Solution or executing it onto a Target 200; Collaboration Manager 470 to allow multiple Users 110 or Experts 120 to share restricted, monitored access to one or more Targets 200; Marketplace 480 where Elements may be commissioned and sold; and, Target Control 500 as described previously.

3.4. Solution Authoring

Figure 11:
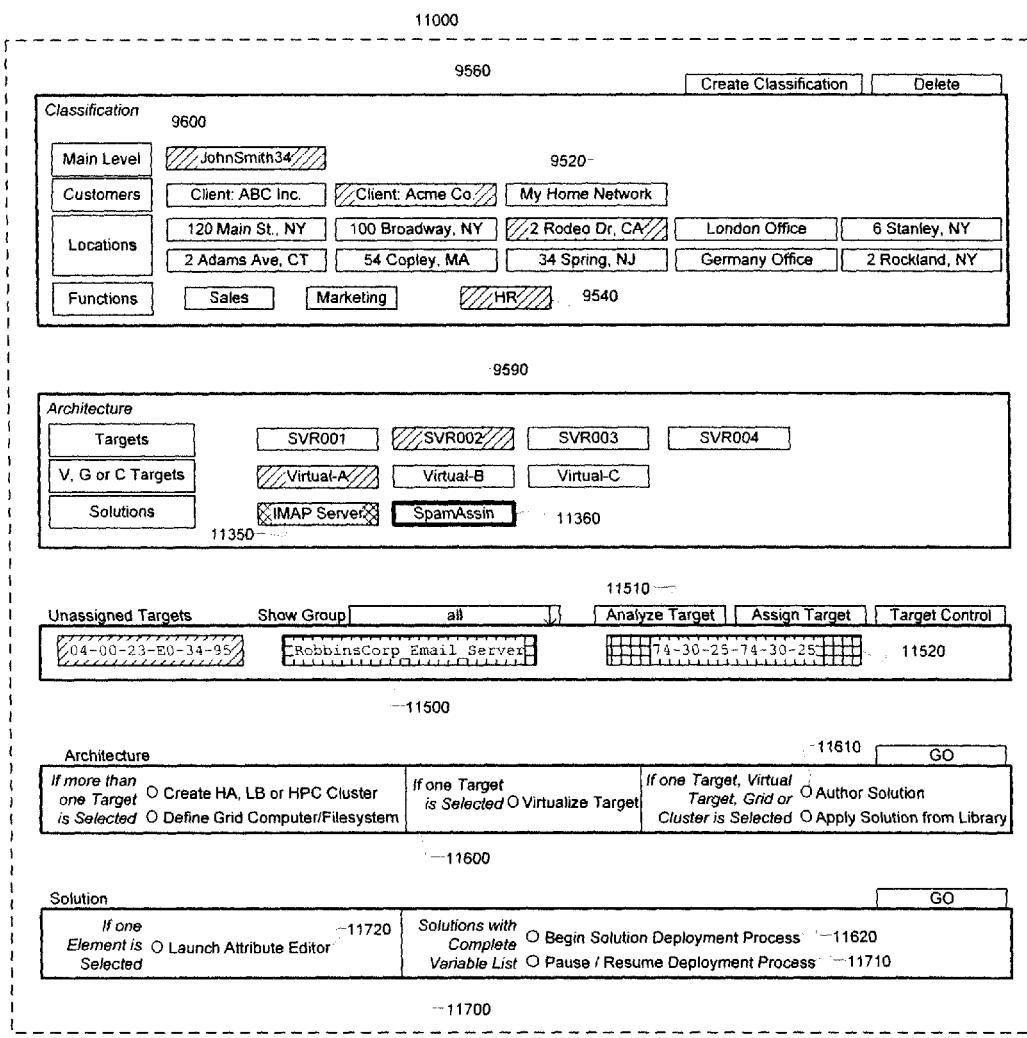
FIG. 11 is a user interface diagram showing an embodiment of solution configuration and deployment.
Figure 12:
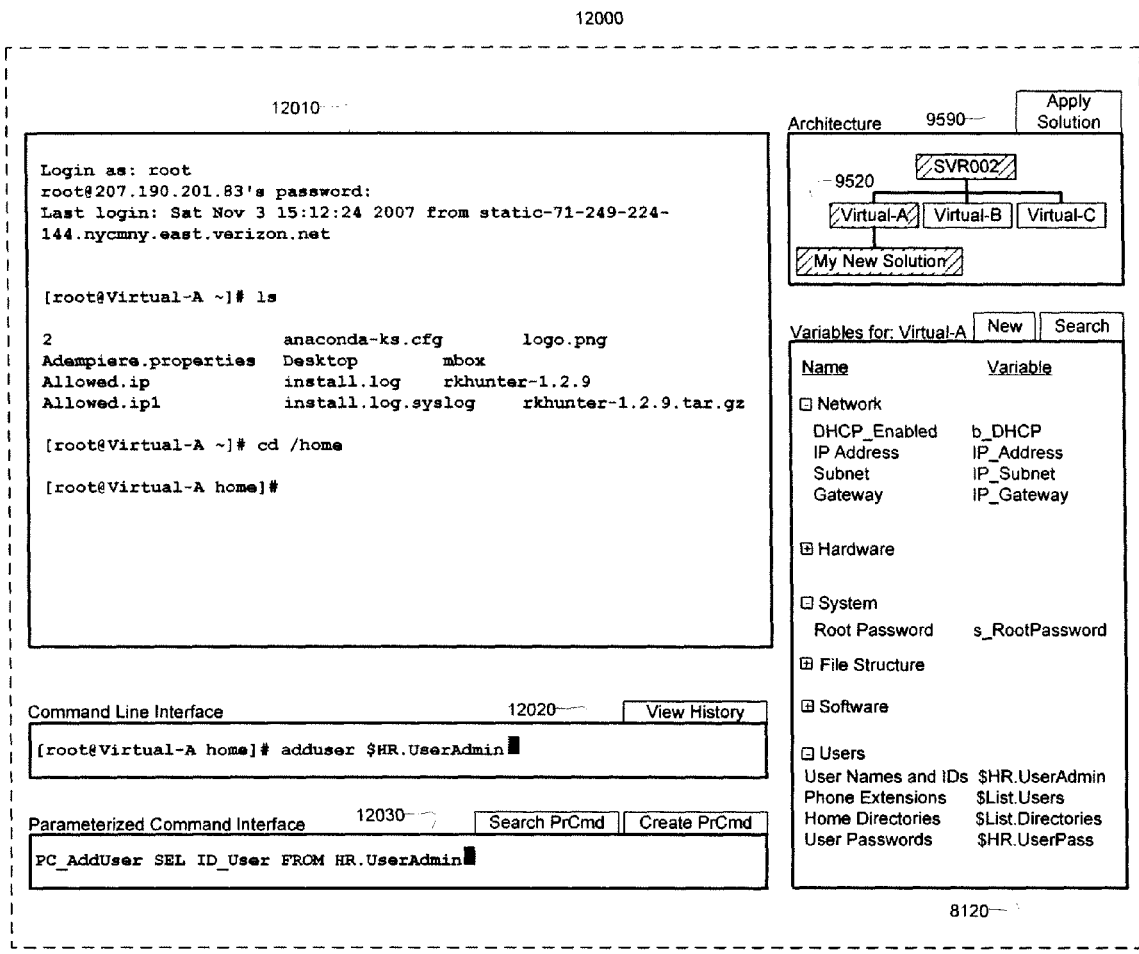
FIG. 12 is a user interface diagram showing an embodiment of solution authoring using the macro record method.

In one embodiment shown in FIG. 2, Solution Authoring 440 is a Workspace 400 component that provides a graphical way to define Classifications, assign Targets, architect the Solution and define a new Element, or extend an existing Element from a library. An example of a Solution Authoring interface is shown in FIG. 11 and FIG. 12.

3.5. Event and Version Log

In reference to FIG. 2, in one embodiment the Command and Control 340 component may maintain an Event and Version Log 850 of User 110 activity such as a history of keyboard and mouse commands, video output and file versions. The Event and Version Log 850 is used with Negating Parameterized Commands to allow the System 300 to undo commands in a similar manner to how the undo feature functions in a modern word processor. For some commands, the System 300 may maintain a pre-defined set of negating instructions that map a command to its inverse which, when applied to the original command, leave the system unchanged. These and other commands are described in the next section.

In order to undo a document modification, the Event and Version Log 850 may maintain different versions of documents that were modified by the User 110 or Expert 120 through the Workspace 400. For example, if the User 110 uses the Workspace 400 to edit a file on the Target 200, the System 300 will first copy that file to the Event and Version Log 850. Examples of such document versioning applications are CVS and Subversion, two widely used applications that track document changes.

This document management database and application may also reside on the Target. To undo a document modification, the System restores the earlier version of that document from the Event and Version Log 850 stored locally on the Target.

3.6. Other Databases

The QA Database 775 stores installation exception histories that are used by the QA Testing, Monitoring and Error Analysis component 420.

Profiles Database 800 maintains the Profiles for Users and Experts and discussed further herein.

3.7. Driver and Firmware Manager

In one embodiment, the Driver and Firmware Manager 300 may maintain a library of current drivers for different hardware components and provide a means to update or install hardware and firmware to Target 200 using procedures described herein.

3.8. Peer-to-Peer Resource Manager

In one embodiment, the System 300 may allow network and computing resources to be shared by Users and Experts. The Peer-to-Peer Resource Manager 330 may provide means to schedule and organize such resources, as described herein.

3.9. Collaboration

In reference to FIG. 2, the Collaboration Manager 470 permits any number of Experts 120 and Users 110 to jointly collaborate on one or more Targets 200 using their own respective Workspaces 400. The Target's 200 owner would grant access to and control the permissions of others, allowing them to view screen output or issue Parameterized Commands to the owner's Target 200. The System 300 applies the Site-Specific or Confidential Information 306 from the owner's Profile 304 to convert the Parameterized Commands into valid Operating System Native Commands to allow the collaborators to issue commands on the Target 200 without requiring knowledge of the owner's Site-Specific or Confidential Information 306.

To maintain the security of Site-Specific or Confidential Information 306, the Collaboration Manager 470 redacts Operating System Native Output by replacing Actual Output with Parameterized Output. This may be accomplished by the Separator process shown in FIG. 1 and a described herein.

4. User Profile Management

In one embodiment of the present invention, the Profile Manager 430 shown in FIG. 2 allows a User 110 or Expert 120 to maintain a Hierarchy of Variables containing Site-Specific or Confidential Information 306 independently of the installation and configuration procedures represented by a set of Parameterized Commands. This separation allows a User to keep this information proprietary and secure while still allowing an Expert to design, deliver and maintain a Solution. This separation also allows an Expert to re-use the Elements for other clients or in other Solutions.

Figure 9:
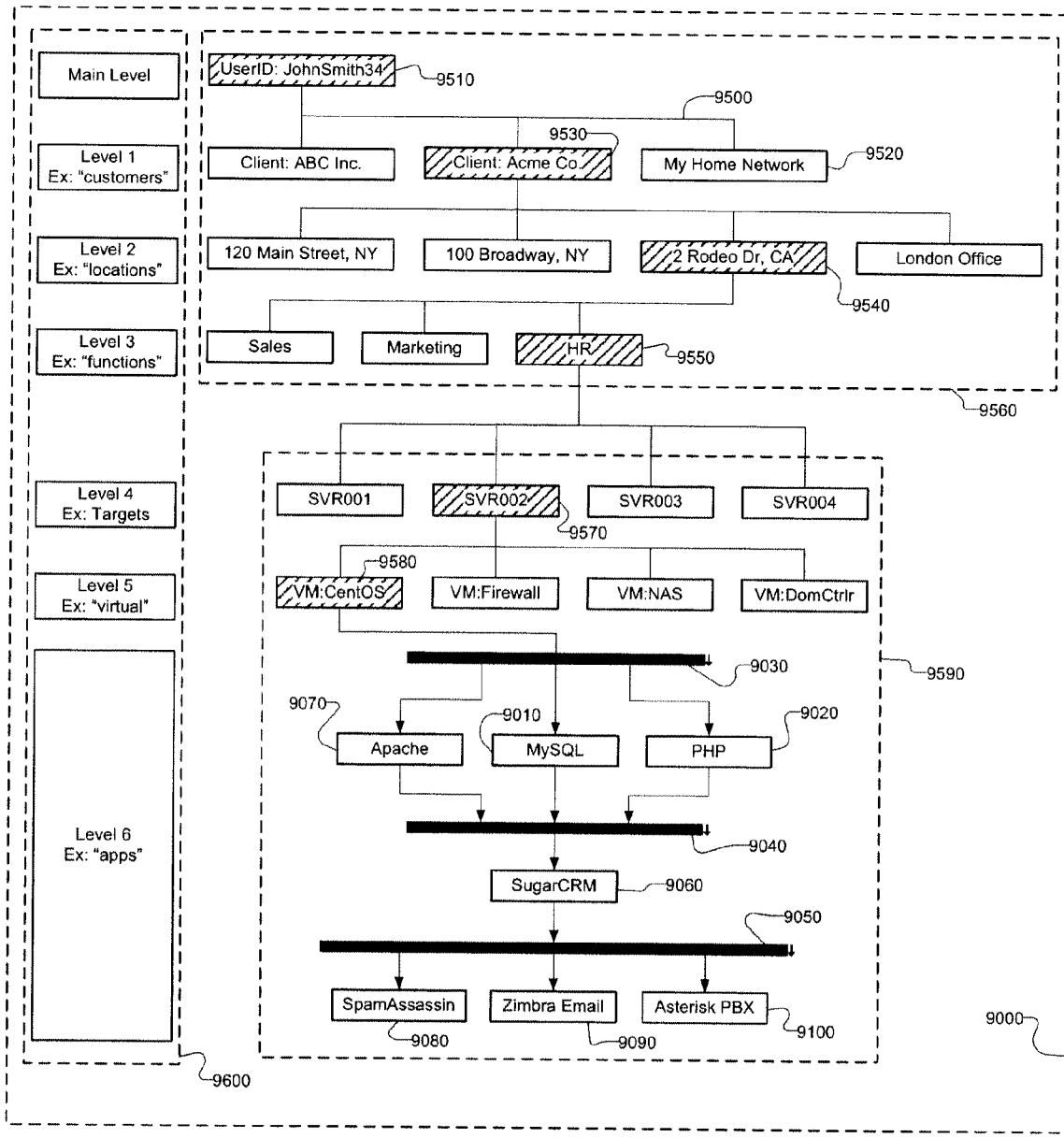
FIG. 9 is a diagram showing a hierarchy of elements according to one aspect of the present invention.

The Profile Manager 430 provides a graphical representation called the Profile View 9000, as depicted by the dashed box in FIG. 9. The Profile View 9000 shows the Classification 9560 and Architecture 9590 of several Elements 9520 arranged in a Hierarchy 9500. In reference to FIG. 9, the Classification Elements are within the dashed box 9560 and the Architecture Elements are within the dashed box 9590. Different Levels 9600 of the Hierarchy 9500 are shown, such as customer, location, function, or role. These Levels are within the dashed box 9600. Classification 9560, which are Elements 9520 that may contain a Local Hierarchy of Variables but no Parameterized Commands, allow a User 110 to maintain separate Site-Specific or Confidential Information for different clients, customers, or other groupings by creating branches in the Hierarchy 9500.

In reference to FIG. 9, examples of Classifications 9560 are the Elements defining Target SVR002 9570 as host computer in the HR 9550 department at the 2 Rodeo Dr. CA 9540 location of Acme Company 9530 which is a customer of John Smith with user ID JohnSmith 9510.

In reference to FIG. 9, examples of an Architecture 9590 are the Elements defining Target SVR002 9570 as a virtualized server where the CentOS-based, virtual environment VM:CentOS 9580 will be configured with the Elements Apache 9070, MySQL 9010 and PHP 9020 which will be installed in parallel as indicated by the Fork Process 9030. As indicated by the Join Process 9040, once all of these Elements are installed successfully the SugarCRM 9060 Element will be installed. Following the successful installation of that Element, another Fork Process 9050 will install Spam Assassin 9080, Zimbra Email 9090 and Asterisk PBX 9100 applications.

A User 110 or Expert 120 may create a new Level 9600 or Element in a Classification 9560 using the Profile Manager 430. (However, an Element in an Architecture 9590 may only be created as part of a Solution Authoring 440 process, as will be described hereinafter.)

It is desirable for the Profile Manager 430 to have an Element Editor 8120 that allows a User 110 or Expert 120 to create, delete and change variables and their values. An example of an Element Editor 8120 is shown in FIG. 8, which shows different Variable Names 8080, Types 8090, Values 8100 and Descriptions 8110 for a hypothetical IMAP Server running on a virtual machine, as shown in the Hierarchy Path 8030.

4.1. Hierarchy

The Hierarchy defines the scope and inheritance of Values for a Variable as well as the installation sequence of Parameterized Commands contained within multiple Elements. Those skilled in the art will recognize the Hierarchy 9500 in FIG. 9 as a Directed Acyclic Graph (DAG) that conforms to the mathematical and computer science principles of such ordered sets, such that no Element may ever be traced back to itself and the Elements may be ordered in a topological sort. The Split 9030 and Join 9040 processes depicted in FIG. 9 are for visual convenience to illustrate command processing. A traditional DAG vertex may also be used.

A Hierarchy in a Profile of a User or Expert is comprised of Local Hierarchies of Variables contained within Elements. The Elements themselves are arranged in a Classification or Architecture Hierarchy. Elements may be created, deleted and relocated within a Hierarchy and new Variables may be created and defined within an Element and placed into the Element's Local Hierarchy of Variables.

Modifying an Element's Local Hierarchy of Variables, or re-arranging Elements within the Classification or Architecture Hierarchies, modifies the Hierarchy in a Profile. In one embodiment, the Profile Manager 430 provides a drag-and-drop or import methods to move Elements or copy Variables from one Element to another. This may be used to clone or transfer the configuration details of one hardware system to another by using the Hierarchy, as this change to the Hierarchy will result in new Values being calculated (using the scope and inheritance prosperities of the Hierarchy) and changes to Values in the Hierarchy trigger the execution of Parameterized Commands, such as Updating Parameterized Commands.

For example, a company may wish to migrate its email server from one office location to another or from a failed server to new hardware. The Hierarchy, through the Profile Manager, provides a drag-and-drop method to configure the destination email servers to exactly match the configuration of the original servers, except that the destination server may be on a different network or have different hardware components.

Likewise, the Profile Manager provides a way to delete Variables from the Local Hierarchy of an Element, but only after confirming that no other Elements are using those same Variables.

4.2. Elements

In one embodiment, the Element 9520 is an object that may contain Parameterized Commands, Parameterized Outputs and a Local Hierarchy of Variables. For example in reference to FIG. 9, the Element 9530 labeled 'Client:Acme Co.' is used for the convenience of grouping this customer's Element 9520 or Targets 200 separate from those of all other customers. The Element 9540 labeled '2 Rodeo Dr, CA' is a label but may also include some Variables that define this location, such as a variable specifying the location's Internet service provider settings. This specific Variable would be inherited by lower-level Elements 9520, such as Sales Marketing and HR which all reside at the same location and therefore share the same Internet service provider. (As will be described below, Variables of lower-level Elements 9520 in a Hierarchy 9500 take precedence over the Variables from a parent Element 9520.)

4.3. Variables

In reference to FIG. 8, a Variable is comprised of a Name 8040, Type 8050, Value 8060 which may also have a default value and Description 8070. A Variable is inherited from the parent Element, but if the Variable already exists in the child Element, then the child's Value overwrites the parent's. Examples of actual Names are shown in a box 8080, Types in box 8090, Values in box 8100 and Description in box 8110.

For example in reference to FIG. 8, the '2 Rodeo Dr' Element 8010 shown in the Hierarchy Path 8030 contains a Variable for 'External IP Address' 8000. This Variable and its Value 8020 propagate to the 'IMAP Svr' Element 8010, but the 'IMAP Svr' may be required to use a different address. In such a case, the IMAP Svr Element 8000 contains its own 'External IP Address' Value 8020 and this value takes precedence over any Values that may exist in parent Elements.

A Variable Type 8050 may include the standard computing types of Boolean, integer, string, table or scalar and may also include custom types that define valid email addresses and domain names. A Type 8050 may also refer to a List, such as a list of users or accounts.

5. Solution Authoring

In reference to FIG. 1, FIG. 2 and FIG. 9, one aspect of the present invention includes a Solution Authoring 440 component, which provides a way for an Expert 120 to architect, define and document a Solution 307. Architecting includes the steps of specifying an Architecture 9590; defining includes the steps of creating a set of Parameterized Commands 307; and, documenting, includes the complete set of Software Installation, Configuration or Maintenance Procedures 1100 generated thereby.

Through the Workspace 400, the Expert 120 is provided secure access to one or more Targets 200, a library of existing Elements stored in databases 825 and 750, a Profile Manager 430 and methods to issue, review and generate Parameterized Commands. Example illustrations of these Workspace 400 interfaces are shown in FIG. 11 and FIG. 12.

A Solution 307 may be created for several types of Targets 200: a stand-alone Target 200, Virtual Target, Grid Target, or Cluster Target. While a Solution 307 may have specific Architecture 9590 prerequisites, such as a Grid-based Solution 307 requiring a Grid Architecture, the Solution Authoring process is identical for these different Target 200 types.

In one embodiment, a Solution 307 may be defined using any combination of three methods: Macro Record Method, where installation and configuration Parameterized Commands are recorded using a staging Target 200; Text Method, where Parameterized Commands are assembled using a text-based editor; and, Re-Use Method, where one or more existing Solutions 307 are combined into a new Solution 307. These methods may be used in combination. For example, two existing Solutions 307 may be merged using the Re-Use Method, extended with new functionality using the Macro Record Method and later modified with a text-editor using the Text Method.

5.1. Parameterized Commands

Parameterized Commands are a generalization of one or more Operating System Native Commands where Site-Specific or Confidential Information, such as passwords, are replaced with Variables arranged in a Hierarchy. This makes the commands independent of Site-Specific or Confidential Information. Parameterized Commands can be converted back into new Operating System Native Commands by applying another User's 110 or Expert's 120 Site-Specific or Confidential Information.

Figure 16:
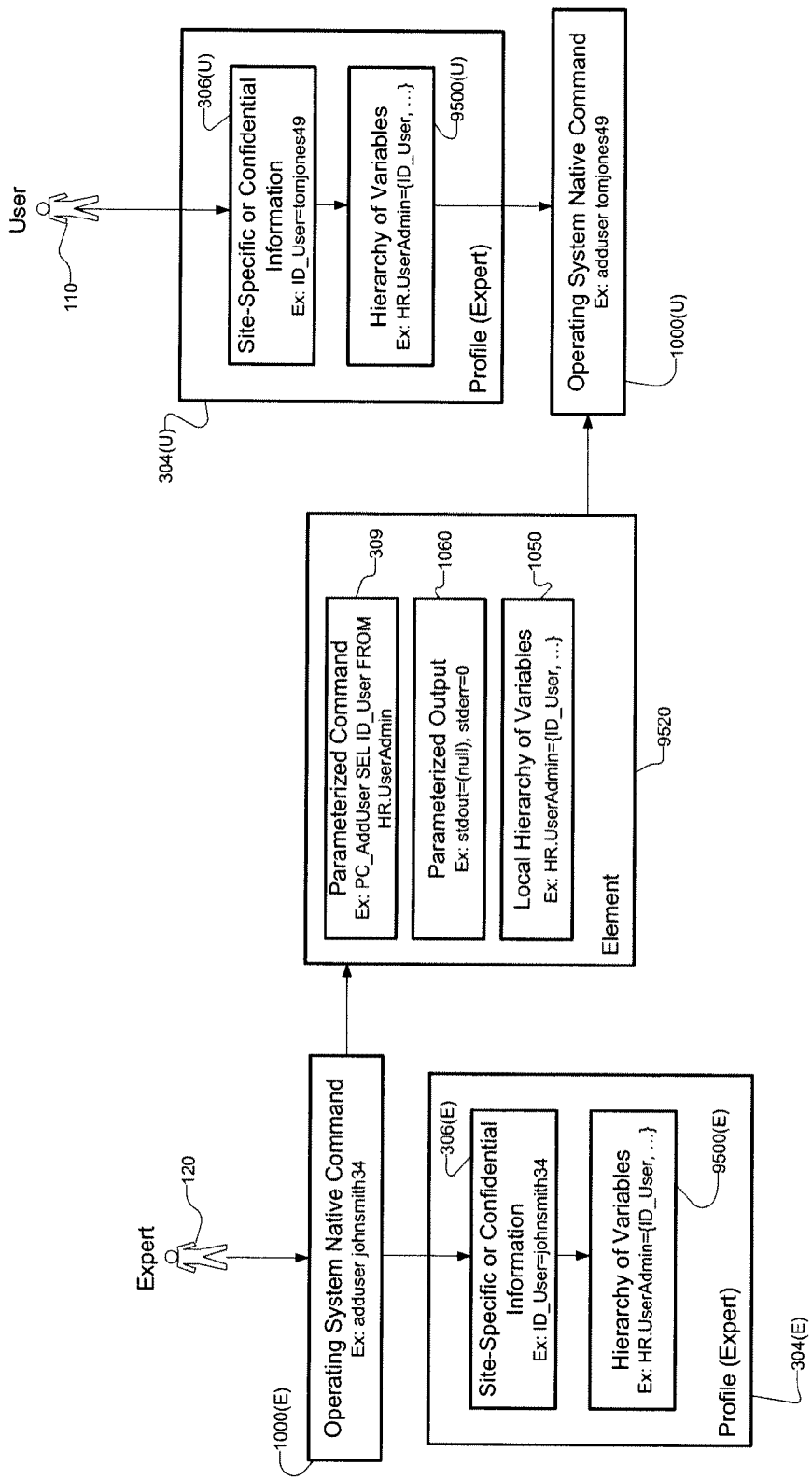

For example, in reference to FIG. 16, the command 'adduser johnsmith34' is an Operating System Native Command 1000(E) entered by an Expert 120 to add a new user account (in this case a user with ID 'johnsmith34') to a computing environment, such as a server. This command combines the specific user ID with the instruction. Using the methods described herein, this Operating System Native Command 1000(E) may be separated into Site-Specific or Confidential Information 306(E) such as 'johnsmith34' for the user ID and a Variable stored in a Hierarchy of Variables 9500(E) such as 'HR.UserAdmin={ID_User . . . }'. The Site-Specific or Confidential Information 306(E) and Hierarchy of Variables 9500(E) are specific to the Expert 120; this information is never shared with another user, such as the User 110.

As shown in FIG. 16 and described herein, the User 110 may acquire the Element 9520 containing the set of Parameterized Command and apply the User's 110 own Site-Specific or Confidential Information 306(U) to generate an Operating System Native Command 1000(U) that has the same effect as the original Operating System Native Command 1000(E) but which now contains the User's 110 own Site-Specific or Confidential Information 306(U).

In this example, the equivalent Parameterized Command is 'PC_AddUser SEL ID_User FROM HR.UserAdmin', where the 'HR.UserAdmin' is the Variable defined in the Local Hierarchy of Variables 1050. The Local Hierarchy of Variables 1050 contains only the Variables used by the set of Parameterized Commands contained in an Element 9520. This Local Hierarchy of Variables 1050 is a subset of the Hierarchy of Variables 9500(E) in the Expert's 120 Profile 304(E) that was defined by the Expert 120 during the Solution Authoring process, as described herein. This Local Hierarchy of Variables 1050 is used to identify Site-Specific or Confidential Information 306(U) maintained by the User 110 in his Profile 304(U) by matching the Variables contained in the Element 9520 to those contained in the Profile 304(U). Furthermore, the Element 9520 may be placed into an Architecture 9590 Hierarchy (as illustrated in FIG. 9) that will define the execution sequence of the Parameterized Commands and inheritance and scope of Variables, as described herein.

As a further example, the Parameterized Command to add all of the users in a list may be 'PC_AddUser SEL all FROM HR.Users' where 'SEL' is a database query instruction to illustrate that Parameterized Commands may incorporate standard structured query language (or SQL) syntax.

In reference to FIG. 16, those skilled in the art will recognize that FIG. 16 is a simplified block diagram with the Separator, Generator and other processes not depicted. These other processes are described herein.

Parameterized Commands may be comprised of a set of Operating System Native Commands as well as other Parameterized Commands. For example, a Parameterized Command to update the value of a configuration setting in a configuration file may be comprised of multiple native commands to: (a) locate the file in the appropriate directory; (b) search the file for the configuration setting; (c) copy all lines preceding this setting to a new file; (d) copy the configuration setting using the updated value to the new file; (e) copy all lines following this setting to the new file; (f) submit the original configuration file into a version management system; and, (g) overwrite the configuration file with the new file. A Parameterized Command such as this may be written as 'PC_Update [filename] [item to update] [new value]'. The System preferably includes Parameterized Commands defined for most UNIX commands. However, a User or Expert may also group one or more Operating System Native Commands or Parameterized Commands into a new Custom Parameterized Command.

Parameterized Commands may also have associated negating, updating, confirming and exception commands. These associated commands are part of the Parameterized Command and are applied by the System in a similar manner described herein. The negating and updating associated commands may have their own confirming commands. For Custom Parameterized Commands, the User or Expert that created the command may also manually create the associated negating, updating, confirming and exception instructions.

Figure 15:
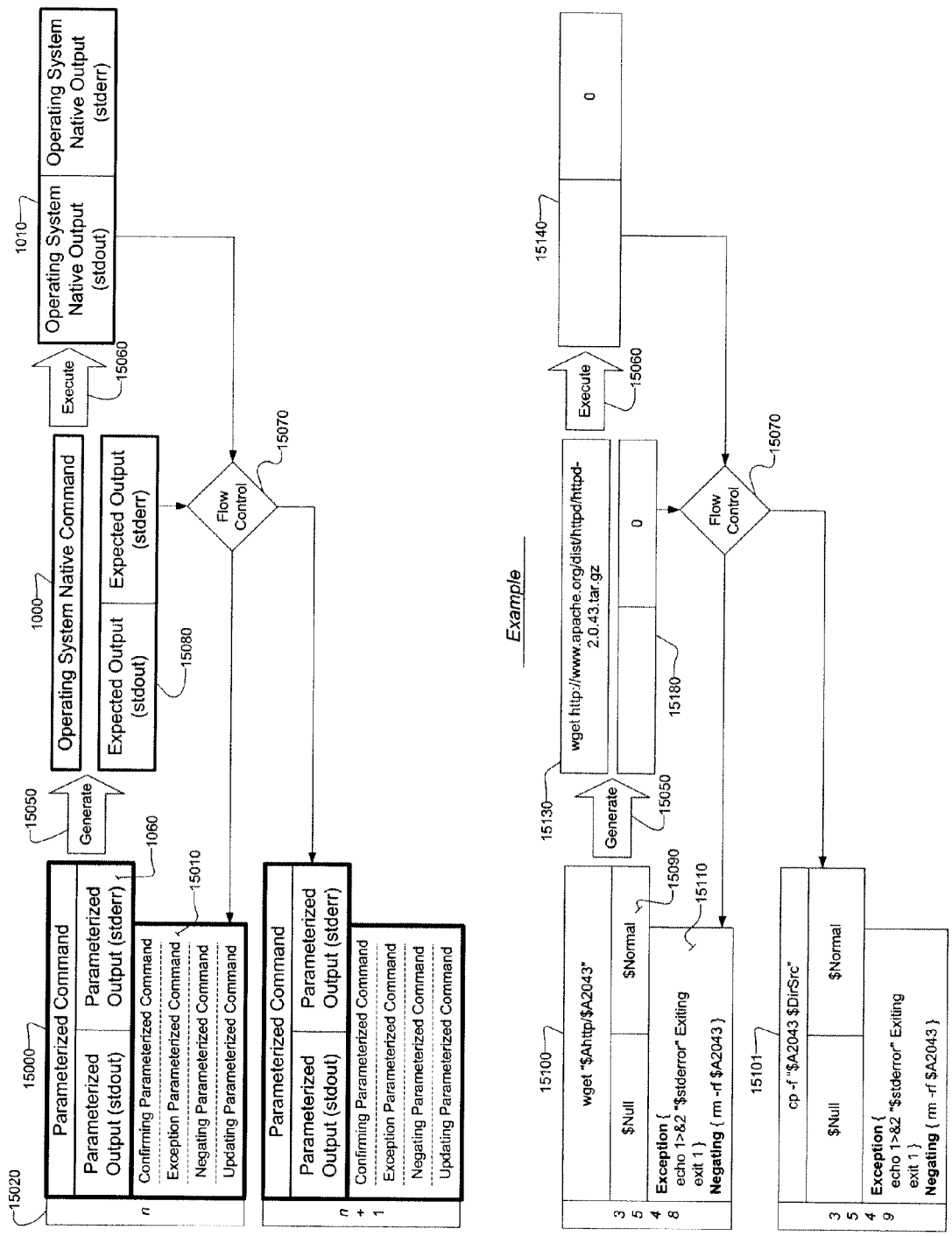
FIG. 15 is an example of an operating system native command, parameterized command, associated parameterized command and expected and actual output according to one aspect of the present invention; and, FIG. 16 is an block diagram showing an example embodiment of converting an operating system native command from the environment of one user to another user.

FIG. 15 illustrates the structure of a Parameterized Command. The Parameterized Command 15000 has Index 15020 number 'n' in a set of Parameterized Commands. The Parameterized Command 15000 may have associated Parameterized Output 1060 for the standard output (stdout) and standard error (stderr) as well as Associated Parameterized Commands 15010 such as Confirming Parameterized Command, Exception Parameterized Command, Negating Parameterized Command and Updating Parameterized Command.

In the example shown on the bottom of FIG. 15, the Parameterized Command 15100 is 'wget "$Ahttp/$A2043"' where '$Ahttp' and 'A2043' are Variables. The Parameterized Output 15090 shows that there should be no response ($Null) on the standard output and a normal response ($Normal) on the standard error after the Parameterized Command 15100 is executed by the Execute 15060 process. The Expected Output 15180 represents the Operating System Native Output 15140 value or range of values that the Operating System Native Command 15130 is expected to generate.

A skilled artisan will recognize that a Negating Parameterized Command is the functional equivalent of an "undo" function. In the example above, a Negating Parameterized Command may retrieve the original configuration file from the version management system and copy it to the appropriate directory, overwriting the current file. When a User or Expert requests to "undo" one or more Parameterized Commands, the system would formulate and execute the Negating Parameterized Commands in the appropriate sequence. The System may also apply a Confirming Parameterized Command to confirm that the Negating Parameterized Command are applied correctly. In the example shown on the bottom of FIG. 15, the Negating Parameterized Command shown in 15110 is 'rm-rf $A2043', indicating that the downloaded file will be deleted.

In this embodiment, an Updating Parameterized Command is issued when a User or Expert updates a Profile, such as when changing variable's value. The System issues an Updating Parameterized Command to apply this new value to the Target. The System may also apply a Confirming Parameterized Command to confirm that the updated value is applied correctly.

Optionally, a Confirming Parameterized Command may be used to independently validate the Parameterized Command's effects and issue an Exception Parameterized Command if the confirmation fails. To continue with the 'PC_AddUser' command example of FIG. 16, a Confirming Parameterized Command may be 'CC_Finger—missing all FROM HR.Users|EC_ErrorMsg("Failed to add user", str)' to indicate that a Confirming Parameterized Command will issue the UNIX 'Finger' command on all users listed in 'HR.Users' and will display only those entries that are missing from the system. These missing entries may be piped to an Exception Command that will display an error message, if any, for each missing user account. An Exception Parameterized Command may then be used to handle error conditions that may occur when a Parameterized Command is executed, such as in the above example.

5.2. Solution Structure

A Solution comprises one or more Elements arranged in a Hierarchy where the Values in each Element's Local Hierarchy of Variables are fully specified by the Site-Specific or Confidential Information in a Profile; a set of Parameterized Commands defines the procedures to install, configure, or maintain one or more software applications on one or more Targets, virtual Targets, Grid Targets or Cluster Targets; and, the Hierarchy defines this installation sequence.

A Solution differs from an Element in that an Element need not have fully-specified Variables. An Element may also be dependent on another Element and thus represent only a fragment of a Solution.

For example, an email server may be created to run on a single Target 200 in which case the set of Parameterized Commands and Local Hierarchy of Variables are included in a single Element. That Element represents the entire Solution when the Element is added to a User's Profile and Site-Specific or Confidential Information 306 details such as IP address, passwords, account lists, etc., are applied to generate Operating System Native Commands.

In another example, a billing and patient management system for a medical office may span multiple Targets and have multiple Elements, such as a calendaring system, database server, web server, IP PBX phone server, etc. These Elements are arranged in a Hierarchy to show relationships between Variables and the installation sequence. In this scenario, the multiple Elements deployed on multiple Targets 200 comprise the Solution when Site-Specific or Confidential Information in a Profile is used to specify the values of Variables.

5.3. Classification Design and Target Assignment

Prior to defining a Solution, an Expert may create a Classification 9560 as shown in FIG. 9 for the purpose of logically organizing Targets to a customer, location and function. This ordering is arbitrary and is just one example, as the User or Expert may create custom Levels 9600 for any purpose. FIG. 11 shows an example user interface 11000 for the creation of Classifications 9560 and Architectures 9590.

The User's or Expert's Targets are either assigned to an Element and shown in the Architecture 9590 section or are listed in the Unassigned Targets 11500 section of the interface 11000. Unassigned Targets 11500 are those Targets 11520 that have connected to the System 300 but have not yet been analyzed to extract information about their hardware, software and network environment.

To extract information about a Target 200, the User or Expert selects the Unassigned Target 11520 and selects the Analyze Target 11510 control. The System subsequently downloads diagnostic software to the Target 11520. This software analyzes the Target 11520 and uploads the information to update the Profile with the Site-Specific or Confidential Information 306 for that Target 11520. The present invention is operable to analyze multiple Targets 200 concurrently. Such diagnostic software is commercially available and well known in the computer technology field.

To add an Analyzed Target 11510 to the Architecture 9590 section, the User 110 or Expert 120 moves its icon to the appropriate Classification Element. The Target Element is created beneath this Classification Element and listed in the Architecture 9590 section. For example, in the Solution Authoring illustration, 'SVR002' is a Target 200 assigned to the 'HR' Element 9520.

5.4. Architecture Types

A Target, according to one embodiment, may be joined with other Targets, virtualized, or used stand-alone. When a Target is joined with one or more Targets that are located on the same local network, then a High-Availability, Load-Balance, or High-Performance Computing Cluster configuration may be architected. When a Target is joined with one or more Targets located on different networks, a Computer or Filesystem Grid may be architected. A stand-alone Target may also be virtualized into two or more Virtual Targets. A Solution may be defined for, and deployed on, a stand-alone Target or any one of the Architectures defined above.

In a High-Availability Cluster Architecture, the System 300 installs and configures fail-over services and redundancy on two or more Targets 200 located on the same local network in order to eliminate any single-point of failure of the Solution. The High-Availability Cluster is sometimes also called a Fail-over Cluster. Prior to creating a High-Availability Cluster Target, the System 300 confirms that the underlying Targets 200 have suitable hardware and network resources such as dual network interface cards, dual LAN segments and sharable storage interfaces such as Network Attached Storage (NAS) or Storage Area Network (SAN). Prior to Solution Authoring or deployment, the System 300 may pre-install a High-Availability Cluster operating system such as LinuxHA or a commercially available product.

In a Load-Balanced Cluster Architecture, the System 300 preferably configures a Solution 307 to operate on multiple Targets 200 which will function as a single system. To achieve this, the System 300 may designate one of the Targets as the management node that will be used to optimize performance of the other Targets assigned to a "server farm". Load-Balancing Clusters are application dependent, as the load-balancing approach for a distributed database is different from that of a distributed web server.

In a High-Performance Computing Cluster, computational tasks are distributed across multiple Targets which are connected by a high-speed network. To implement this architecture, the System may automatically create a networked, shared file system and implement a "trust" relationship among the Targets. It may also automatically install and configure a parallel virtual machine and a message passing interface to enable distributed parallel processing on the Targets and designate one Target to act as the Cluster's main user interface and gateway. The Linux Beowful cluster is an example of a High-Performance Computing Cluster which the System may deploy.

In a Computer or Filesystem Grid, heterogeneous Targets located on different networks are configured to provide CPU or storage resources as a service. These Targets run a custom application, called middleware, that is used to advertise resource availability and allows storage or computation requests to be assigned to the Target. These middleware applications may be proprietary, such as the Oracle Grid, or open source such as the Berkeley Open Infrastructure for Network Computing. To implement this architecture, the System may automatically install and configure a base operating system along with the middleware application.

In a Type-1 (also called Native) Virtualization, the System installs a hypervisor application on a Target in order to create Virtual Targets. The System may analyze the Target's hardware to confirm that it is capable of being virtualized. For example, the System may check for adequate RAM, a CPU that supports virtualization and the presence of interface devices that may require special drivers. The System may automatically install virtualizing software and compile drivers to support the Target's hardware. After installing the virtualizing software, the System deploys the host operating system which will be used to deliver the Virtual Targets.

In a Type-2 (also called Host) Virtualization, the System first installs a host operating system such as Linux, following the standard procedures described elsewhere for installing a Solution. After the host operating system is installed, the System will install the hypervisor application in a similar manner described above. The hypervisor application will enable additional host operating systems that may be used to deliver the Virtual Targets.

In OS Virtualization, an operating system is partitioned to support multiple virtual Targets. Linux virtualization and OpenVZ are two examples of such operating systems. The installation of an OS Virtualization operating system would follow similar procedures for installing a traditional operating system on a Target, with the new host operating systems recognized as separate virtual Targets.

The methods to install a High-Availability Cluster (such as LinuxHA), Load-Balanced Cluster (such as load-balanced Apache servers), High-Performance Computing Clusters (such as Beowful), Computer or Filesystem Grids (such as Berkeley Open Infrastructure for Network Computing) or the various types of Virtualization (such as VMWare, XEN or others) are well known in the computer technology field and such methods may be encapsulated into an Element's set of Parameterized Commands to allow the deployments to be automated in a similar manner described herein.

5.5. Macro Record Method

In one embodiment of the present invention, a Macro Record Method is used for Solution Authoring. The method is illustrated by the flowchart in FIG. 7 and example interfaces are shown in FIG. 11 and FIG. 12.

In the Macro Record Method, the Expert uses a Solution Authoring interface such as the example interface shown in FIG. 11, to specify a Target, Virtual Target, Grid, or Cluster Target and select the Author Solution 11610 control. The System logs into the selected Target or group of Targets. After a description and name for the new Solution is entered, the Workspace displays a web interface similar to that shown in FIG. 12, showing Console 12010, Command Line Interface 12020, Parameterized Command Interface 12030, Architecture 9590 stub for the Target and the Element Editor 8120. In FIG. 12, the Macro Record Method is being used to create a Solution labeled 'My New Solution'.

Using this interface, the Macro Record Method allows the Expert to define a Solution using the Target as the development environment. In this process, the Expert will use the Element Editor 8120 section to define new Variables for each Element 9520 comprising the Solution 307; specify Variable's default values, descriptions and types; and, specify type checking rules to confirm Users 110 enter valid values. Some Variables types may be built-in, such as character string, integer and list. However, the Expert may also create new types.

In reference to FIG. 12, the Expert 120 may enter commands using the Command Line Interface 12020 or the Parameterized Command Interface 12030, with the Solution Authoring 440 component converting between native instructions and Parameterized Commands, replacing Variables with actual values and vice-versa.

Figure 7:
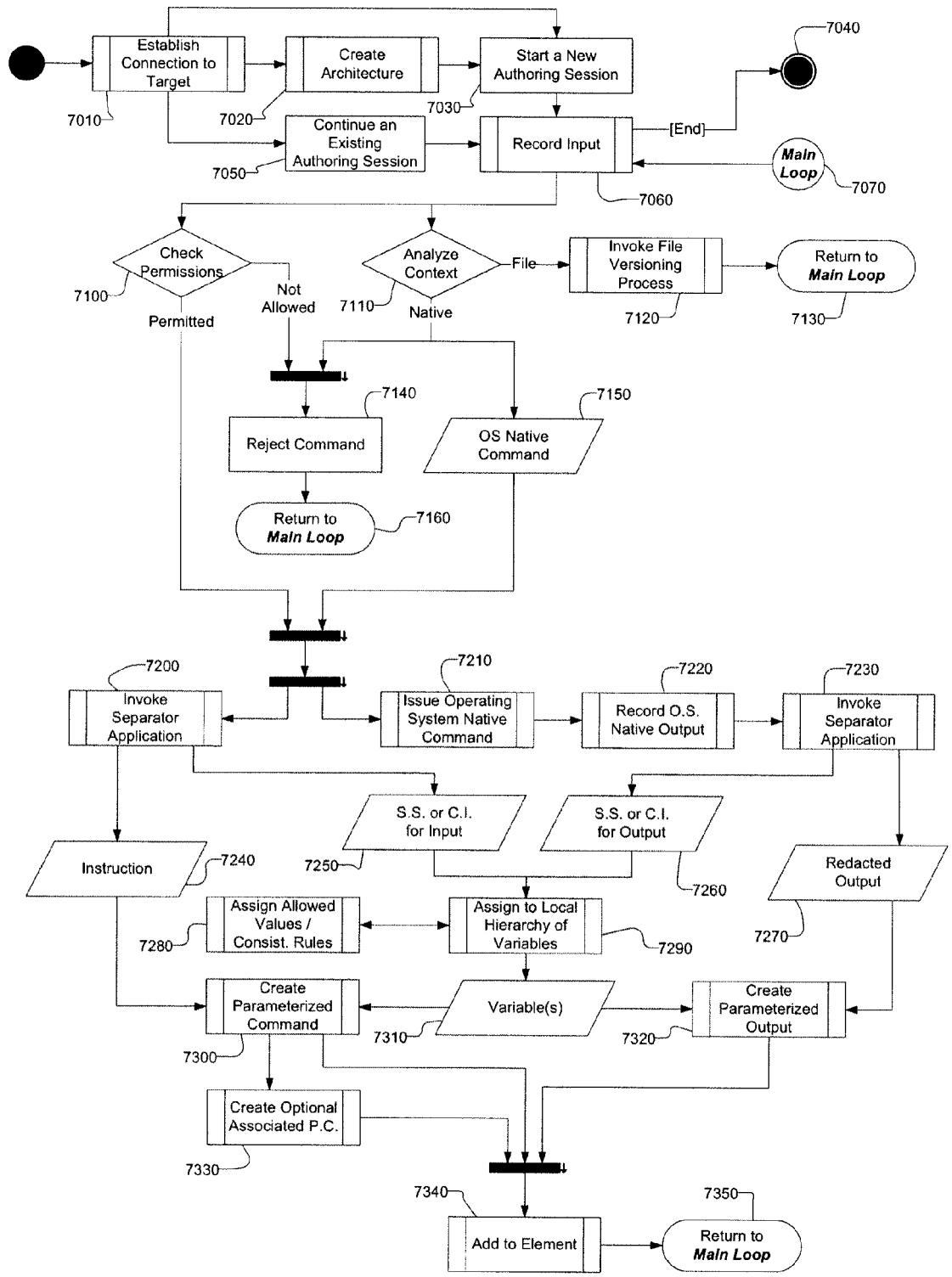
FIG. 7 is a process flowchart showing an embodiment of solution authoring.

An example process to convert an Operating System Native Command into a Parameterized Command is illustrated in FIG. 7. As discussed above, process 7010 establishes a connection to the Target using methods described elsewhere. The Expert may specify an Architecture as shown by process 7020, Continue an Existing Authoring Solution by as shown by process 7050 and further described below, or Start a New Authoring Session as shown by process 7030. All of these processes will lead to the Record Input process 7060, where the Expert enters Operating System Native Commands using the interfaces described above.

The Record Input process 7060 is preferably the starting point for the command processing loop. It also permits the Expert to end the Solution Authoring process, as shown by the end point 7040. The Record Input process 7060 accepts the Expert's graphical or text input to create an Input that is passed to decision processes 7100 and 7110.

The Input may be analyzed for context by the decision process 7110. When a new Solution Authoring process is started, the default context is "Native" to indicate that operating system commands will be issued. An Operating System Native Command may change this context. For example, launching a text editor changes to context to "File" to indicate that the Expert is modifying a file and not actually entering commands for execution by the Target's operating system. The processing example shown in FIG. 7 illustrates the Native and File contexts, but other contexts are possible.

It is also desirable for the Input to be analyzed to determine whether the Expert has appropriate permissions to execute the command by the decision process 7100. For example, the Expert may be acting upon another User's Target and that User has granted the Expert a subset of all Operating System Native Commands. This scenario is described herein.

If the Input is "Permitted" and the context is "Native", then an Operating System Native Command has been entered into the interface and will be processed in the manner described below. The Operating System Native Command is depicted by the data element 7150. If the Input is "Not Allowed" and the context is "Native", then the command will be rejected by process 7140 and the exit element 7160 will return the processing to the Main Loop 7070. If the context is "File", then the Expert is modifying a file which will be added to a file versioning system. Examples of such systems are CVS and Subversion but any file versioning system may be used. The Invoke File Versioning Process 7120 will allow the file to be edited and the changes associated with a Parameterized Command so that subsequent deployments of a Solution will apply the necessary updates or modifications to the same file, or create the file. After the file is versioned, the exit element 7130 will return the processing to the Main Loop 7070. File versioning is a well-known process and marking the changes so that they may be re-created or undone at some later time is a standard procedure.

When the Input is "Permitted" and the context is "Native", then the Operating System Native Command is transferred to two parallel flows as represented by the Invoke Separator Application process 7200 and the Issue Operating System Native Command process 7210. This begins the recording process to record and process the command and output.

The parallel process represented by the Invoke Separator Application 7200 uses the context of the Operating System Native Command data element 7150 to identify the Instruction data element 7240 and the Site-Specific or Confidential Information data element 7250. The Site-Specific or Confidential Information data element 7250 is specific to the Input entered by the User.

The context of the Operating System Native Command is further used to assign the Site-Specific or Confidential Information element 7250 into a Local Hierarchy of Variables using process 7290. This process 7290 uses a context-specific lookup to identify the associated Variable 7310. This lookup process is described elsewhere.

As the Expert creates a set of Parameterized Command in an Element, the Local Hierarchy of Variables for that Element is defined. In process 7290, new Variables are created, placed into the Local Hierarchy of Variables or relocated within the Hierarchy. The process 7290 also allows an Expert to assign allowed Values or create Consistency Rules to Variables, as shown by process 7280. Default values may be specified for a Variable where this default value is assigned whenever an Element is transferred between Users. By overwriting the Site-Specific or Confidential Information contained in the Element with this default value, the confidentiality and security is maintained while the software installation, configuration and maintenance instructions, represented by the Parameterized Command List, are re-used.

The Variable data 7310 and the Instruction data 7240 are converted into a Parameterized Command by process 7300. This Parameterized Command is functionally equivalent to the original Operating System Native Command but is now comprised of one or more Instructions referencing one or more Variables. Optionally, the Expert may also create Associated Parameterized Commands such as Confirming, Negating, Exception and Updating Parameterized Commands described elsewhere. This optional process is shown by process 7330.

The parallel process represented by the Issue Operating System Native Command 7210 issues the unaltered Operating System Native Command to the Target and records the Operating System Native Output using process 7220. This output is sent to the Separator application using process 7230, resulting in the separation of the Site-Specific or Confidential Information from the Operating System Native Output as shown by the data element 7260 where the abbreviation for that data element stands for "Site-Specific or Confidential Information for Output". The output's Site-Specific or Confidential Information 7260 is converted into a Variable element 7290 using the Assign to Local Hierarchy of Variables 7290 process in the same manner described above for the other parallel process. As is standard in computer programming, the same process 7290 is re-used for different objects. As those skilled in the art will recognize, the object created from processing the output data element 7260 is different from the object create from processing the input data element 7250, even though the same process 7290 is used to process both objects.

The Variable element 7310 and the Redacted Output element 7270 are converted into a Parameterized Output by process 7320. This process replaces the output's Site-Specific or Confidential Information with the Variable. Process 7280 allows the Expert to specify acceptable values or range of values as well as consistency rules for the Variables in the Parameterized Output, in a similar fashion as described above for the Input. The Parameterized Output is functionally equivalent to the original output but is now comprised of one or more Operating System Native Outputs and one or more Variables.

When parallel processes 7300 and 7320 and optional parallel process 7330 complete, they are added to the Element by the process 7340. The processing returns to the Main Loop 7070, as indicated by the exit terminator 7350.

As someone skilled in the art will recognize, the Operating System Native Command may generate an error response on the Target. For example the command may be mistyped or have the wrong syntax. The example process illustrated in FIG. 7 represents the normal flow. As someone skilled in the art will understand, the processes described above also contain error-handling routines. Error handling techniques are widely known in the computer science field.

In addition to entering Operating System Native Commands into the Record Input process 7060, the Expert may also enter Parameterized Commands. In this scenario, the context would be "Parameterized Command" and the Generator software application would be used to replace the Variables with Site-Specific or Confidential Information as described in more detail elsewhere and illustrated in FIG. 10 by process 4120 which uses the data from the Hierarchy of Variables 4080. With respect to FIG. 7, the Parameterized Command is executed on the Target and added to the Element by process 7340. Since the Parameterized Command would already reference Variable in the Hierarchy of Variables, the Input may be added directly to the Element without using the Invoke Separator Application 7200. The Issue Operating System Native Command process 7210 would be invoked independently, after the Parameterized Command is converted into an Operating System Native Command by the methods described elsewhere.

In addition to entering an Operating System Native Command or a Parameterized Command as described above and illustrated in the processing flow illustrated in FIG. 7, the Expert may also reference Variables directly. An example of this is shown in FIG. 12. Using the interface denoted by the dashed box 12000, the Expert issues the 'adduser' instruction but instead of specifying an actual user ID, the Variable '$HR.UserAdmin' is substituted. This is shown in the Command Line Interface 12020. The Solution Authoring 440 component retrieves the Variable's value from the User's Profile as shown by Element Editor 8120 and issues the Operating System Native Command on the Target 200 without disclosing this value on the Command Line Interface 12020 or Console 12010.

FIG. 12 also provides an example of how the Expert may enter Parameterized Commands using Interface 12030, which is the Parameterized Command equivalent of the "adduser" example above. Finally, the Console 12010 allows the Expert to enter Operating System Native Commands directly and the Architecture browser 9590 provides a way for the Workspace to show the Local Hierarchy of Variables within specific elements. For example, the Variables shown in Element Editor 8120 may be specific to the Element 9520 within the Architecture section 9590.

5.6. Re-Use Method

In the example Re-Use Method of the present invention, an Expert incorporates one or more source Elements into a destination Element. The set of Parameterized Command and Local Hierarchy of Variables contained within each source Element are incorporated into the destination Element. One embodiment of the Re-Use Method is illustrated in FIG. 7 by process 7050, where the Expert appends additional Parameterized Commands into an existing Element. Within the destination Element, the source Elements are arranged in a Hierarchy.

Similar to the Macro Record Method, the Re-Use Method uses the Target or Targets as the development environment. In one embodiment discussed herein, the Target may be an emulator or virtual environment provided by the System.

Before any Solution Authoring may occur, the source Elements must be converted into a partial Solution and applied to one or more Targets. Once the Targets are in a state represented by the source Elements and the Expert's Profile, Solution Authoring may continue with new Parameterized Commands added to the destination Element.

5.7. Text Method

In one aspect of the Text Method, the Expert makes changes by editing an Element's set of Parameterized Commands directly. This method may be used to create an entire Element from scratch.

The Text Method allows an Expert to incorporate Operating System Native Commands, Parameterized Commands referencing Variables arranged in a Hierarchy of Variables and instructions from scripting languages such as Python and others.

5.8. Master Variable List and Aliases

During the Solution Authoring process, an Expert 120 may create a new Variable or reference an existing one. A Variable external to an Element 9520 may be incorporated by reference to a Master Variable List, which is maintained by the System 300 as the global list of Variables that are arranged by functionality. The Master Variable List provides a way to standardize variable terminology and eliminate redundancy.

In situations where an Element 9520 redefines a Variable that is defined elsewhere in a Profile 304, the User 110 may create an alias in the Profile 304 cross referencing the Variable.

5.9. Solution Documentation

The set of Parameterized Commands and Local Hierarchy of Variables for each Element of a Solution define the complete installation, configuration or maintenance procedures that any skilled individual may follow to recreate, modify, or troubleshoot the Solution. The Hierarchy of Elements describes the Architecture and components on which the Solution operates.

The set of Parameterized Commands may be represented in a Project Plan where each Parameterized Command is a task with dependencies. These dependencies may be defined by the IT Expert 120 during the Solution Authoring process using the Macro Record Method or afterwards using the Text Method.

Using the Macro Record Method, dependencies may be defined by the number of Console 12010 screens simultaneously connected to the same Target 200 and the sequence of concurrent commands entered into the separate screens. The Solution Authoring 440 component may organize these concurrent commands so that they execute in parallel when the Solution 307 is deployed. In the Project Plan, these commands will show a "Start to Start" dependency, indicating that they start at the same time.

Similarly, the commands entered sequentially in each Console 12010 screen will be interpreted by the Solution Authoring 440 component as having a "Finish to Start" dependency, indicating that the first command must finish before the next command begins. The Expert 120 may also define dependencies within the Custom Parameterized Command by using standard UNIX techniques to spawn processes that run in parallel or sequentially. Using the Text Method, an Expert 120 manually specifies a "Finish to Start," "Start to Start," or "Start to Finish" dependency for two or more Parameterized Commands.

The System 300 preferably records an estimated duration for each Parameterized Command and uses this in the creation of Gantt and Pert charts to graphically illustrate a Solution 307, determine a critical path and obtain an estimated duration of the entire deployment process. To aid readability, the Expert 120 may create group headings for a collection of tasks listed in the set of Parameterized Commands. These headings will be used in the Project Plan to represent components or command groupings.

6. Solution Deployment

In one aspect of the present invention, a Solution's configuration and deployment are initiated by a User through a Workspace 400 user interface, such as one embodiment shown in FIG. 11. This interface is used to initiate the process of Solution deployment which will employ the Profile Manager 430, Solution Deployment 460 and Command and Control 340 components. In one embodiment, a Generator software application executes on the Solution Deployment 460 server and a Control software application executes on the Command and Control 340 server.

Figure 10:
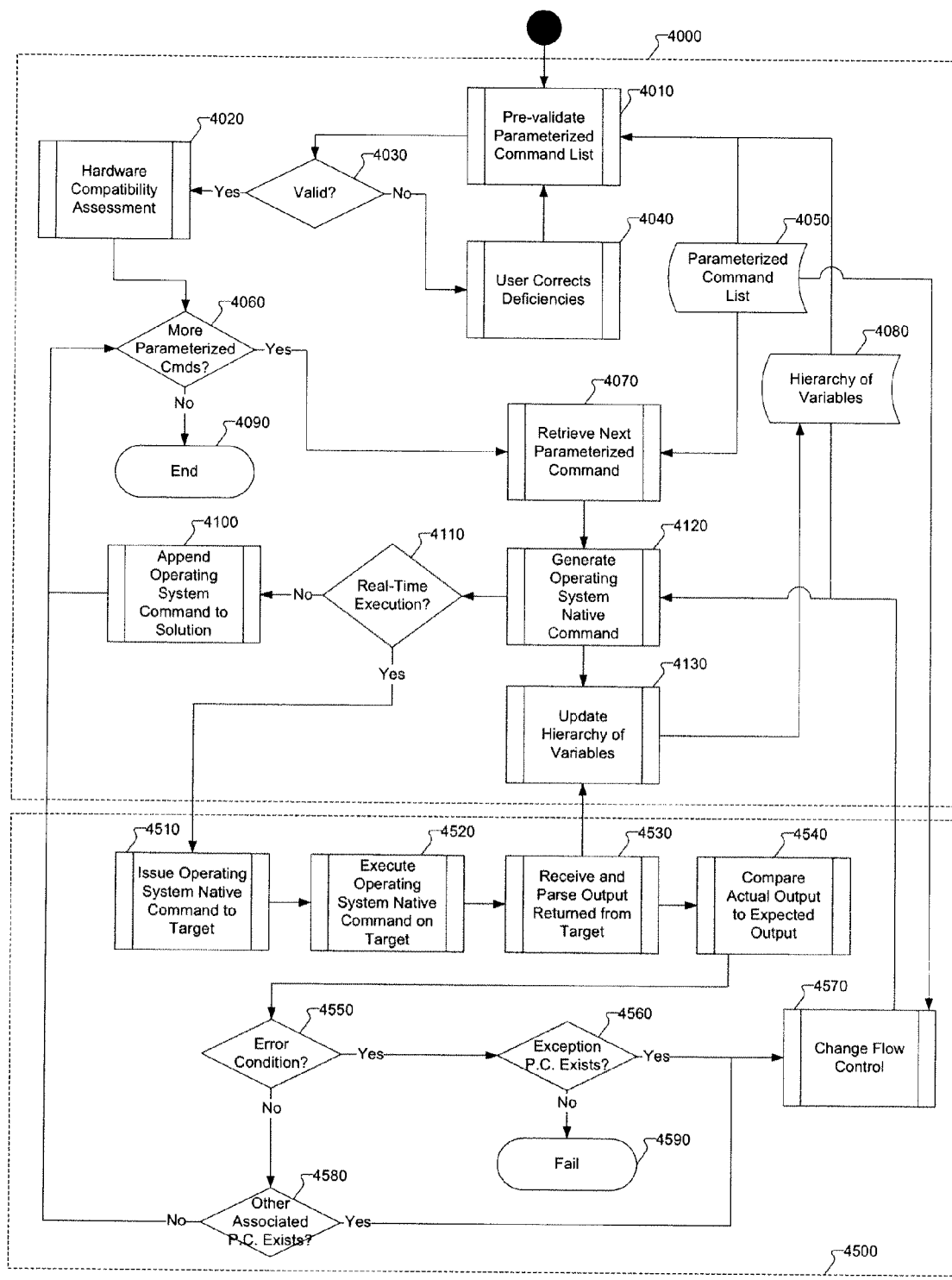
FIG. 10 is a process flowchart showing an embodiment of solution configuration and deployment.

FIG. 10 is a flowchart illustrating one aspect of the Generator and Control functionality where the Generator functionality is bounded by the dashed box 4000 and the Control functionality is bounded by the dash box 4500.

As described previously, the Parameterized Commands comprising a Solution are assembled from Elements where the Hierarchy defines the installation sequence. Once a User 110 initiates the deployment of a Solution 307 to a destination Target 200, the System 300 assembles the Solution's Variables and set of Parameterized Commands using scope, inheritance and sequence rules defined by the Hierarchy.

6.1. Variable Validation

In reference to FIG. 10, the "Pre-validate Parameterized Command List" process 4010 is used to identify incomplete or incompatible Profile 304 Values or Variables. In one embodiment, the Workspace will provide the User an interface to see incomplete or incompatible settings and allow the User to correct the deficiencies, as specified by the process 4040 and the Validation Check 4030.

For Solutions where the Variables are not fully specified or incompatible, such as the hatched Element 11350 in FIG. 11, the User 110 clicks-to-select the hatched Element 11350 and clicks-to-select Launch Variable Editor 11720. The Workspace 400 preferably presents the User 110 with missing or incompatible Variables for editing in the Element Editor 8120 illustrated in FIG. 8.

Incompatible Variable Values are identified by screening each Value against the bounds and consistency rules specified by the Expert when the Parameterized Commands was originally created. In addition, the Expert may specifically require that a User 110 confirm a Variable's Value even though the Solution has a valid default Value. If a User's Profile 304 does not contain Values for all Variables, default Values may be used instead.

For Solutions 307 where the Variables are fully defined and compatible, such as the bold-outlined Element 11360 in FIG. 11, the Workspace provides the User the option to Begin Solution Deployment Process 11620 or, for deployments currently underway, the ability to Pause or Resume the Deployment Process 11710.

6.2. Solution-Hardware Compatibility Check

Before deployment begins, the Solution Deployment 460 performs a Hardware Compatibility Assessment as shown by the process 4020 in FIG. 10.

If there are known conflicts between a Target's hardware components and the selected Solution, then the Workspace will inform the User and allow the User to proceed with the deployment regardless of the known conflict, select a different Target, select a different Solution, modify a Variable Value (such as disabling a Target's component to eliminate the conflict), or delay the deployment until the Target's hardware component is replaced with one that is compatible.

In determining potential hardware conflicts, the System refers to the QA Database 775, which contains error analysis for all prior deployments of the Solution 307, as will be described below.

6.3. Solution Creation

In reference to FIG. 10, for each Parameterized Command comprising the Solution, where the Parameterized Commands may come from one or more Elements and the Hierarchy determines the processing sequence, the Generator "Retrieves the Next Parameterized Command" 4070 from the "Parameterized Command List" 4050, starting with the first Parameterized Command and continuing until no more Parameterized Commands remain to be processed.

According to one aspect, the process 4120 then retrieves Values from the Hierarchy of Variables, using the Element's location in the Hierarchy to determine scope and inheritance. (This is the Element which contains the Parameterized Command in the current state of being processed.) The Variables in the Parameterized Command are then replaced with the calculated Values to generate the Operating System Native Command.

As Parameterized Commands are processed, the Values in the Hierarchy of Variables may change. The "Update Hierarchy of Variables" process 4130 connects to the Profile Manager in order to update Values, using the Element's context to determine a Variable's location in a Hierarchy.

The Operating System Native Command may be appended to a Solution, as shown in process 4100. The Solution may be a text file or compiled software application containing the list of Operating System Native Commands. This Solution is in the form where it may be manually executed on a Target by someone suitably skilled in the art.

6.4. Real-Time Control Process

The Operating System Native Commands may be issued to a Target in real-time, where the Operating System Native Output from the Target is used to determine the Flow Control of Parameterized Command processing. Real-time execution may be a more robust Solution Deployment method as Exception Parameterized Commands can be used to resolve a wider range of unexpected results.

As shown in FIG. 15, one embodiment of Flow Control 15070 may be to compare Operating System Native Output 1010 with Expected Output 15080. This comparison is used to determine which Parameterized Command 15000 or Associated Parameterized Command 15010 will be generated by the Generate process 15050 and executed by the Execute process 15060.

As shown in FIG. 10, the "Real-Time Execution" decision process 4110 may be used to determine whether the Generator software application will interface with the Control software application, where the Control software application determines the flow control of Parameterized Command processing.

The Control process 4500 uses the "Issue Operating System Native Command to Target" process 4510 to deliver the command to the Target. The Target's operating system executes the command, as shown by the "Execute Operating System Native Command on Target" process 4520 and Operating System Native Output is generated and returned to the Control software application. This output is parsed by the "Receive and Parse Output Returned from Target" process 4530.

The Operating System Native Output generated by the Target as well as the Operating System Native Command generated by the Generator software application may affect the Values in the Hierarchy of Variables. Process "Update Hierarchy of Variables" 4130 interfaces with the Profile Manager in order to update the Variables in the Hierarchy of Variables. This updating may include updating a Variable's value as well as creating, moving or deleting Variables within the Hierarchy.

The Parameterized Command may include Expected Outputs, in which case the "Compare Actual Output to Expected Output" process 4540 is used to determine whether an error condition exists using the decision process 4550.

If an error condition does not exist, then the Control software application determines whether the Parameterized Command contains another associated Parameterized Command, such as a Confirming, Negating or Updating Parameterized Command, using the decision process 4580. If another Associated Parameterized Command exists, it is moved to the top of the Parameterized Command List by the "Change Flow Control" process 4570 and the Generating process continues from the "Generate Operating System Native" command process 4120 in the manner described above.

As someone skilled in the art will recognize, the processing described above will be recursive so that Associated Parameterized Commands are added to the top of the execution stack. This is desirable because Associated Parameterized Commands may themselves contain Exception and other Associated Parameterized Commands which must be executed in a recursive manner.

6.5. Exception Handling

In the process of issuing commands on the Target, the Solution Deployment component may encounter an exception (such as an error) on the Target. An Expert may have anticipated exceptions and incorporated exception instructions into the Parameterized Command. In such a situation, the Solution Deployment 460 component executes the exception instructions.

In situations where the Solution Deployment 460 component is unable to resolve exceptions on its own, User or Expert intervention may be required. Notification may be sent via email or text message to the User or Expert or through the Workspace activity monitor. The User or Expert evaluates the exception and may change a Variable's Value, take temporary control of the Target and enter a manual override command, or terminate the deployment. Exceptions are logged into a QA Database where they can be analyzed, as will be discussed below.

In reference to FIG. 15 and FIG. 10, if the Operating System Native Output 1010 is outside of the Expected Output 15080 value or range of values, then an error condition is identified by the decision process 4550. The Flow Control 15070 process determines whether the Parameterized Command has an associated Exception Parameterized Command, using the decision process 4560. If no Exception Parameterized Command exists then a deployment failure has occurred, as indicated by the final state "Fail" 4590.

If an error condition exists and the Parameterized Command has an associated Exception Parameterized Command, then the Flow Control 15070 process changes the flow control of Parameterized Command processing. The Exception Parameterized Command is moved to the top of the Parameterized Command List by the "Change Flow Control" process 4570 and the Generating process 4000 continues from the "Generate Operating System Native Command" process 4120 in the manner described above.

As described herein, Variables within the Parameterized Output 1060 may include a range of allowed values. In this situation, Flow Control 15070 will compare the Operating System Native Output 1010 to a range of Expected Outputs 15080.

7. Solution Maintenance

After a Solution 307 is deployed, a User 110 may make changes, such as adding new users or updating passwords, directly using the User's Profile 304 or a web-based graphical interface that was created by the Expert 120. The Solution 307 may also be maintained on behalf of the User 110 by another User 110 or Expert 120 as a service, as will be described below.

As part of the Solution Authoring process, the Expert 120 defines what actions to take when a User 110 makes a Profile 304 change, such as moving Elements 9520 or changing a Variable's Value. For example, a User 110 may move an Element 9520 to a different location, where different network settings exist. These new network settings are inherited by the relocated Element 9520, causing its Variables to change. For each Variable that has changed, the System 300 executes the updating Parameterized Commands previously defined by the Expert 120. In the case of a new network settings example, the Parameterized Commands would update the Target 200's configuration to use the new values. (In this example, the physical device would also have to be moved to the new location for the network settings to be consistent.)

A separate, web-based graphical interface may also be used as a "front-end" to the User's Profile 304 and to incorporate other functionality specific to a Solution 307. This graphical interface is preferably designed by the Expert 120 in order to provide a simpler way to maintain the Solution 307. For instance, it may allow a simpler way to add email accounts or define telephone extensions and may provide this functionality independently of the Workspace 400. Web interfaces to standard software applications exist today, giving the Expert 120 the option of modifying an existing interface or building one from scratch. This separate, web-based graphical interface would have a separate login and authentication system in order to make the interface separate from the Workspace 400.

8. Quality Assurance Testing, Monitoring and Error Analysis

As the Solution Deployment 460 component deploys a Solution 307 to one or more Targets 200, it uses the Control Agent 240 to monitor the output of each Parameterized Command for expected and unexpected results called exceptions. During and after Solution deployment, the QA Testing, Monitoring and Error Analysis 420 component tracks exceptions and may also use the Monitor Agent 270 to log events such as hacking attempts, security breaches and performance.

For example, during a Solution Deployment the creation of a directory should result in that directory being present and writable. If this is not the case, then an exception has occurred and will be logged by the QA Testing, Monitoring and Error Analysis 420 component in the QA Database 775. After the Solution is deployed, it may generate disk errors, indicating the likelihood of a pending disk failure; unusual email activity, indicating the possibility of a security breach; or, it may have slow database access metrics, indicating the possible need for additional RAM.

8.1. Testing and Error Analysis

During the Solution Deployment process, the QA Testing, Monitoring and Error Analysis component attempts to find correlations between Exceptions and the Target's Variables such as hardware components, drivers and previously installed software applications. An example of such a correlation is shown in the histogram in FIG. 14. In this figure, the Index 15020 of a specific Parameterized Command is used to show the Exception Frequency 14000 across different Variables 14030. These different Variables 14030 represent the superset of all Variables encountered during numerous Solution Deployments by different individuals on different Targets at different times.

As the Solution is deployed by different individuals on different Targets, the Exception Frequency 14000 for each Parameterized Command is generated across the superset of Variables. This superset of Variables increases with each Solution Deployment. Exceptions occurring for Variables that are the same across these Targets will show a high Exception Frequency, such as 14010. In this example, the Parameterized Command #3592 shown by reference 14020 has a high Exception Frequency 14010 of 18%. These Exceptions appear to be greatest when the Solution is deployed on a Target containing the 'Gforce 2MX' component 14040. In this manner, each Parameterized Command comprising a Solution may be graphed according to the Variable or Variables most likely to be in conflict.

The QA Testing, Monitoring and Error Analysis 420 component maintains a normalized Exception Frequency versus Target Variables for each Parameterized Command in a Solution. As used herein, the normalized Exception Frequency is calculated as follows: (a) for each Parameterized Command where an Exception occurred during a Solution Deployment, the System increments a counter for each Variable in the User's Profile used for that Solution; and, (b) for each Parameterized Command, the counter for each Variable is divided by the total number of Exceptions for that Parameterized Command.

Figure 14:
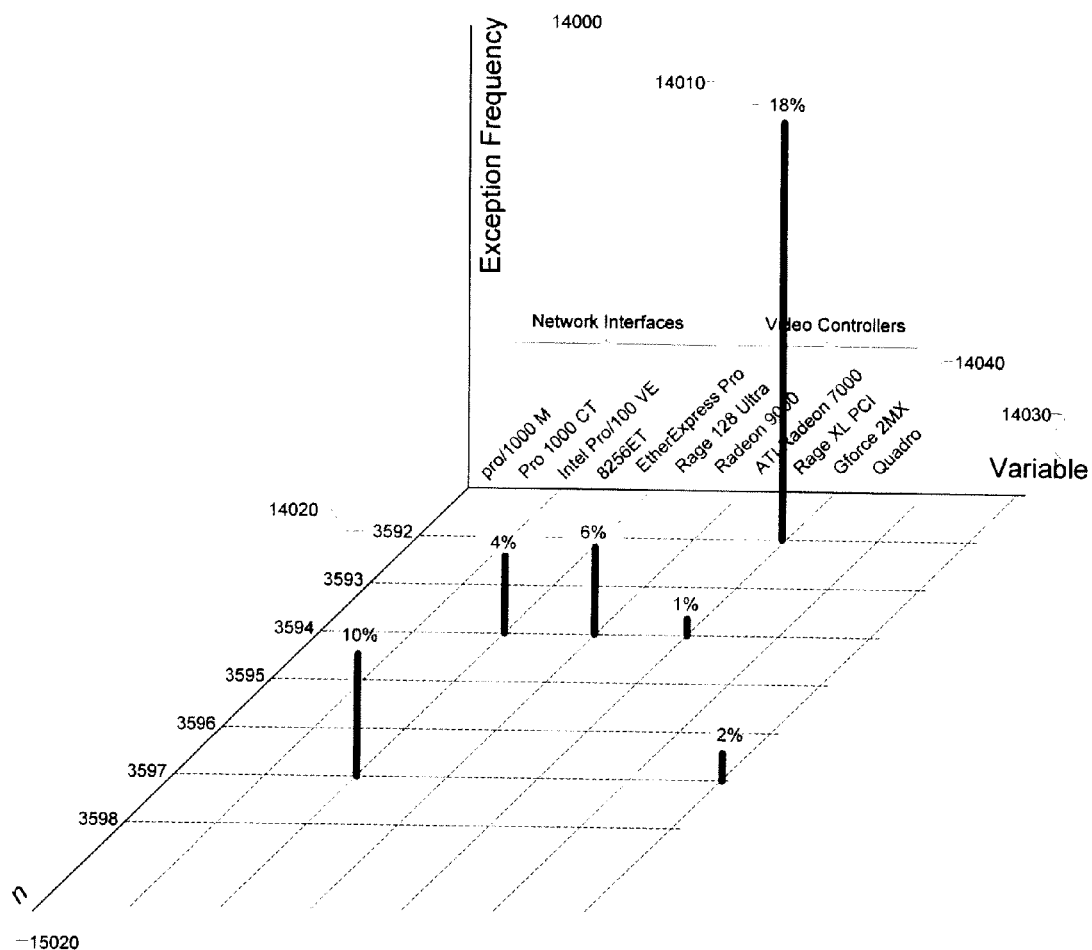
FIG. 14 is a histogram showing an example embodiment of quality assurance testing.

The quality assurance, testing and error analysis information is presented to the Expert in summary form, such as the histogram of FIG. 14, so that the Expert may improve the Solution. For example, a Solution may consistently fail to install when a Target has a specific brand of hard disk controller, indicating a conflict between the hardware or its driver and another software component. The QA Testing, Monitoring and Error Analysis component provides this information to the Expert, who uses it to further diagnose the problem in order to improve the quality of the Solution, perhaps by incorporating a diagnostic test in the set of Parameterized Commands and branching the installation procedure to overcome a specific conflict.

This QA Testing, Monitoring and Error Analysis component calculates a Solution's installation success history for a given Target configuration and presents this information to a User that is using a Target with similar components. For example, an email Solution may have a 90% probability of installing correctly on a User's Target, but a CRM Solution may only have a 50% probability of installing correctly on the same Target. This probability is based on the experience of other Users who installed the Solution on identical or similar hardware and will allow the User to gauge the Solution's robustness and quality.

8.2. Monitoring

After a Solution's deployment, the Monitor Agent may periodically provide information about a Target's and Solution's performance. This information is used by the QA Testing, Monitoring and Error Analysis component to log system errors arising from hardware failure or software conflicts and mis-configurations; unusual network, disk or CPU activity that may indicate a security breach; and, performance metrics such as storage, RAM and CPU utilization that may indicate whether a Target's capabilities are approaching a limit.

An Expert may create the monitoring set of Parameterized Commands that is used to monitor a Solution's security, reliability and performance as part of the Solution Authoring process. This set of Parameterized Commands is run by the Monitor Agent for diagnostics and not for Solution Deployment. The monitoring set of Parameterized Commands may be used to notify the User of unusual activity or pending problems. An example of such a monitoring interface is shown in FIG. 13. A Target performing normally may be indicated as 'Monitored: Health' as shown by reference 13010. A Target with a hardware problem may be indicated as 13020. A Target experiencing unusual activity, such as break-in attempts, may be indicated as 13030.

The QA Testing, Monitoring and Error Analysis 420 component shown in FIG. 2 may also be configured to send the User or Expert an electronic or telephony alert when a predetermined event occurs. For example, it may send an email or pager message or place a pre-recorded telephone call to the User when a Target becomes unresponsive.

9. System Migration and Cloning

In situations where a User may have a legacy IT system, the System may be used to extract the Site-Specific or Confidential Information of the legacy system and apply it to a new Solution that provides comparable or superior functionality. In this manner, a User may migrate a legacy IT system to a modern Solution running modern IT hardware.

For example, a company may have a proprietary customer-billing system. To migrate it to a modern ERP system, the customer records are extracted from the legacy system and applied to a different type of ERP Solution. This Solution may be deployed on a modern computer server, thereby providing the company a cost efficient and fast way to migrate their billing system.

9.1. Migration

To achieve this migration, one embodiment of the System uses the Control Agent to install an Analysis Application on the computers running the legacy system. This Analysis Application is specific to each type of legacy system and extracts configuration settings and converts data files to a standard format. For example, to migrate an existing Oracle database to a new MySQL database, the Analysis Application running on the Target would export the Oracle data and structure. This data and structure are then uploaded to the System where they becomes part of a User's Profile and applied to a Solution on a new Target using the procedures described above.

The new Solution may also be deployed to the original computing hardware. After the Site-Specific or Confidential Information is uploaded to a User's Profile the original hardware may be reformatted with a new operating system and a new Solution deployed. Using this approach, the legacy hardware is re-used for the Solution, which is configured with the original data.

The above two approaches may be combined such that a legacy hardware system is analyzed, its data extracted and applied to a User's Profile, the legacy hardware is subsequently reformatted and the legacy hardware is added to a cluster or grid or is virtualized. A new Solution (containing the legacy data) is deployed to a Target which is, or may include, the original hardware.

9.2. Cloning

The System may also be used to clone an existing system to another hardware platform. A Control Agent may be used to download a commercially available cloning application, such as Ghost or DriveImage, onto the Target that is to be cloned. The output of the cloning application, such as the disk image, is transferred to the System and stored in User's Profile as a new Element. The User may then move this Element to a different Target Element whereupon the disk image is installed on that Target. In this manner, the System may be used to simplify and automate the cloning of one system to another.

10. Re-Configurable Targets

The techniques described above may be combined to quickly change a Target's purpose. Using these techniques, for example, a data center with many Targets may redeploy computing resources as demands for particular IT resources change. For example, a data center may have Target's used for web servers and transaction processing as well as spare servers. As the data center's need for transaction processing increases, the spare servers (which are connected to the System) are automatically configured to provide processing services (for example, by adding another database server to a cluster).

Additionally, the System may monitor the load on other servers to determine whether additional resources are required in a cluster, based on predetermined business rules. For example, as the data center's transaction load decreases and web server load increases, the System may decommission a transaction-processing Target, reformat it into a web server by deploying a web server Solution and configure it to join the web cluster group.

The predetermined business rules for deciding whether to re-configure a Target are incorporated into an Element that may comprise a data center Solution, for example. The System then monitors Targets comprising this Solution and implements the business rules, such as re-configuring computing resources as described above. To redeploy a Target, the System first quiesces processes on that Target 200, activates a Control Agent and deploys a new Solution to the Target.

11. Marketplace

The Marketplace 480 component shown in FIG. 2 allows Users and Experts to exchange Solutions, Services and IT Resources.

11.1. Solutions

In one embodiment the Marketplace 480 component provides a marketplace for the exchange of IT know-how in a secure and reproducible manner. This allows an Expert 120 to develop the know-how once and have the System 300 automatically apply it multiple times to Targets 200 in different locations and with different hardware. It also allows Users 110 to obtain IT know-how or augment their IT skills without divulging Site-Specific or Confidential Information.

After defining the Solution, the Expert may publish the Solution to the Marketplace 480 and make it available to others as a free or paid service. In addition, the Expert 120 may provide updates to the Solution, also on a free or paid basis. Users 110 identify the Solution by searching on the System's website or Workspace 400.

When a Solution is authored through the System 300, the Solution's code base may be verified. This eliminates the risk of distributing malicious software through compiled applications, as the Solution may only be allowed to incorporated trusted applications (such as Linux, Apache, etc.) that were obtained from the External Solution and Software Library 750. The set of Parameterized Commands is also available for review, as the System documents the Solution Authoring process as described above.

The Marketplace 480 may also provide a way for Users 110 to commission the creation of custom Solutions. Users 110 may describe their requirements using a message board on the Marketplace 480 and Experts 120 may submit proposals. The User may select one or more Experts to create the Solution in the manner described above.

11.2. Searching for Solutions

A User seeking a Solution uses the Marketplace 480 system to search for existing Solutions created by Experts. In one embodiment as shown in FIG. 2, these Solutions are stored in databases 825 for Solutions stored on the System and 750 for Solutions stored externally. Solutions may be searched by using a Target's capability or functionality as the search criteria.

When searched by Target's capability, an analysis software application is used to analyze the Target and the local area network containing the Target to extract Site-Specific or Confidential Information. This information determines which Solutions are to be deployed on the Target in its specific network environment. For example, the Target's CPU or RAM memory may be insufficient for computationally-intensive processes, but the Target's storage capacity and speed may make it an ideal NAS server. Therefore, NAS-type Solutions would be recommended. The recommended Solutions may be presented in a diagram from least-suitable to most-suitable.

A standard search by functionality or usage may also be used to identify Solutions. For example, an email, calendar and collaboration Solution may be identified using functionality keywords; or, Solutions for "patent records management" or "law office case system" may be identified using market or usage keywords.

11.3. Acquiring Solutions

An Expert may choose to publish his Solution, in the form of an Element, such that other Users may search for and obtain it using the Marketplace 480 system.

Solutions created by an Expert may be Acquired 1120 by a User, as illustrated in FIG. 1. In one embodiment, acquiring a Solution involves the steps of redacting the Expert's Site-Specific or Confidential Information stored in the Element's Local Hierarchy of Values with default or blank values, transferring the Element from an Expert to a User, adding the Element into the User's Profile and re-calculating values for Site-Specific or Confidential information using the User's Hierarchy to determine Variable's inheritance and scope. A final step may require the User to add missing values.

Redacting an Expert's or User's Site-Specific or Confidential Information from an Element's Local Hierarchy of Variables involves the steps of applying a Variable's default value; or in situations where a default value has not been specified, leaving the Variable blank or unassigned. A Variable may be blank, or unassigned, during the course of the assignment process as its value will become specified once the Element is incorporated into a new Profile.

Adding an Element into an existing Profile allows blank or unassigned Variables to be determined using the Hierarchy's inheritance and scope rules defined previously. Any Variables that are not thus determined, and which lack default values, must be specified by the User before the Solution may be deployed. Variables' permissible values or range of values as well as consistency rules are transferred unchanged.

The Parameterized Commands within the Element extend the Parameterized Commands of parent Elements, if those parent Elements contain any Parameterized Commands. In this way, a larger Solution may be created by building a Hierarchy of Elements where each Element defines the software installation, configuration or maintenance procedures for a component of the overall Solution.

11.4. Services

Similar to a marketplace for IT Solutions, the System 300 allows Experts 120 to sell services to Users 110. These services may be technical support, such as helping a User 110 recover lost data, or maintenance support such as remotely monitoring a User's Targets. The Collaboration Manager 470 allows a User 110 to grant access to other Users 110 or Experts 120 to access specific Targets 200 or Element 9520 while still keeping Site-Specific or Confidential Information 306 secure, as described above.

Further, an Expert 120 may deliver services to individuals that have not registered with the System 300. This may be accomplished by allowing the Expert 120 to provide that individual with the Expert 120's own Boot Disk 210. That individual uses this Boot Disk 210 to connect a computer to the System 300 that is accessed by the Expert 120.

11.5. Resources

An individual or company may have servers (e.g. CPU resources), storage and bandwidth that are not fully utilized. The Peer-to-Peer Resource Manager 330 component shown in FIG. 2 may be used to allow that individual or company to sell these IT resources to others on an on-demand basis. When using the Re-configurable System technique described previously, a User may obtain an Element that allows a Target to be partitioned and allows unused (or underutilized) partitions to be made available to others through the System 300

For example, a Solution may be created to combine Targets into a cluster or partition one Target into virtual servers. Some of the cluster or virtual server resources are used to deploy a company's Solution, while the rest of these resources may be made available to others in the Marketplace 480. The Peer-to-Peer Resource Manager 330 controls these resources and advertises their availability to others using the Marketplace 480.

The Peer-to-Peer File Resource 330 manages the network of IT Resources so that changes in availability of the underlying equipment are transparent to buyers of IT Resources. For example, servers will be constantly added and removed from the IT Resources Marketplace 480 for numerous technical (e.g. hardware failure) or business (e.g. the owners hardware requirements have changed) reasons. The Peer-to-Peer Resource 330 moves CPU, storage and bandwidth resources from one server to another based on these changes and pending availability and keeps mirrored copies of data in several locations.

The Marketplace 480 manages resource scheduling, accounting and billing, allowing an IT Resource seller to specify when their equipment may be available (e.g. only in the evening and weekends) and at what price they are willing to make their equipment available (e.g. the server is available only for $0.75 per CPU-hour and above). When a resource is withdrawn from the IT Resources Marketplace 480, the System 300 may also re-configure that resource so that it may be returned to its owner's data center (e.g. the resource will be re-configured into a web server and added to the server farm).

12. Self-Building Systems

In one embodiment, a Solution may be delivered on DVD/CD-ROM/PXE to boot a server which then activates/configures other servers in order to self-build a multi-server system without User intervention or connection to System. According to one example of this process, the Solution with all configuration files may be transferred from System to an image (which may be a network boot image). This image is preferably self-sufficient: it will boot master server and use it to configure slave servers. In addition, the master server will provide network booting and images for slave servers.

13. Craft Interfaces

One aspect of the present invention also provides a Workspace to one or more devices which may only permit Telnet-type connections. The Workspace allows automation of control of these devices using their native craft interfaces, which are command line interfaces specific to devices such as legacy routers, switches and PBXs.

In one embodiment, the System establishes a communication link to one or more such devices by connecting via Telnet, SSH or similar protocol using a Gateway Target 6010. The techniques used to establish Communication Links via a Gateway Target 6010 have been discussed previously. Connecting via a Gateway Target 6010 allows the System to issue commands to the devices that may be located behind restrictive firewalls.

The Workspace includes business rules and logic to allow a single Web event to generate a series of commands that modify the settings on one or more devices using those devices' craft interface commands. For example, adding a new extension to a telephone switch may require multiple command line instructions to be entered using the switch's craft interface. The same series of commands may be issued by the Command and Control server whenever a "New Extension" method is executed on the Workspace.

Those skilled in the art will recognize that deploying Web front-ends to craft interfaces are a standard technique used to modernize legacy hardware. Using the techniques described here for Gateway Target 6010 connections, Solution Authoring and Solution Deployment, a more useful and novel way to integrate and control such legacy hardware into modern Web-based services is enabled. For example, legacy hardware located in different geographic regions may be integrated with modern systems in such a way that a single web interface provides control over these multiple disparate systems. Moreover, the passwords for these legacy devices may remain confidential while access is granted to Experts, in the manner described previously.

14. Solution-Specific Innovations

In addition to the techniques described above, the System 300 makes possible Solution-Specific innovations that are made possible by employing these techniques.

14.1. Remote Network Analysis

Occasionally, a User may be experiencing network-related issues and require the assistance of an Expert to diagnose and fix network problems. Using the System, the Expert may provide the User with a Boot Disk image, such as an ISO image, that the User will transfer to a CD-ROM and insert into the computer experiencing the problem or into a computer attached to the network experiencing the problem.

The CD-ROM may be used to boot the computer and connect it to the System, whereupon the computer becomes a Target that is part of the Expert's Target List. The Expert may then install testing software on the Target without affecting the Target's current configuration, transforming the Target into a network monitoring device. The Expert installs the Monitor Agent on the Target and uses the Workspace to monitor network activity. Using the Workspace, the Expert may spot network-related problems such as collisions or bad packets. The Expert may also use the Target as an SNMP trap to collect network information that is uploaded to the Workspace for analysis.

14.2. Remote Data Recovery

One embodiment of the present invention contemplates that a User may experience a hard disk or file-system problem on a computer and require an Expert to recover lost data. When data loss occurs, a standard procedure is to isolate the hard disks involved so that no further damage may occur. The Expert may provide the User 110 with a Boot Disk image, such as an ISO image, that the User copies to a CD-ROM and uses to boot the affected computer. By booting the computer using the CD-ROM, the computer's hard disks are not used for file access as the computer's operating system is loaded from the CD-ROM.

As such, the computer is connected to the System whereupon it registers as a Target in the Expert's Target List. Once connected, the Expert may perform hard disk analysis and upload the hard disk's data to the System where it may be further analyzed and data recovered. The Expert may also install memory-resident applications on the Target (without disrupting the computer's affected hard drives) and perform analysis locally.

The Boot Disk may be used in combination with a different data storage device, such as a Hard Drive, USB Flash Drive, Floppy Disk, or optical disk to assist with file recovery. The Boot Disk is transferred to a CD-ROM that is used to boot the computer, but an external Hard Drive, Floppy Disk and/or USB Flash Drive is also connected to the Target. These other devices may be used to store recovered files from the affected hard drive so that the recovered data is not uploaded to the System.

In some situations, it may not be possible to directly access a computer's affected hard disk, such as when the hard disk is attached to a RAID controller. In these situations, the User 110 would have to relocate the affected hard drive to a standard SCSI, ATA, or SATA controller. In the case of a RAID array, each hard disk comprising the array would have to be connected to a SCSI, ATA, or SATA controller. The analysis and recovery procedure is similar to the above except that the tasks must be performed on all drives comprising the array and the data merged to allow the data to be recovered.

Data and file recovery may occur on the Target or on the System. To perform data and file analysis on the System, a disk image of the affected hard drive may be created and uploaded to the System where the disk image becomes part of an Element. The image in the Element may be analyzed by a specially-designed application running on the System or the Element may be cloned to another Target where the disk image is analyzed.

15. Remote Security Monitoring

Intrusion detection systems are used to monitor a network for security breaches and are typically stand-alone or virtual servers that are connected to a network's gateway or other strategic point where all network traffic may be monitored.

A User or company that wishes to deploy an intrusion detection system may use the System to identify an Expert for deployment and/or monitoring services. The Expert provides the User with a Boot Disk image, such as an ISO image, that is transferred to a CD-ROM by the User and inserted into a virtual or stand-alone server that is appropriately connected to the network. Once connected, this computer becomes a Target that is part of the Expert's Target List. The Expert then installs the appropriate network monitoring, logging and intrusion detection service and the System will monitor the service using the Monitor Agent. When a pre-defined event occurs (such as suspicious network traffic), the System will notify the Expert who may then determine whether this event requires further attention.

15.1. Remote Computer Support

A User may require assistance in repairing a computer, such as removing viruses or spyware, upgrading software, installing peripherals or re-installing an operating system. These tasks may be accomplished using the System where an Expert provides a user with a Boot Disk image, such as an ISO image, that the user transfers to a CD-ROM, inserts into the computer and allows the computer to become a Target in the Expert's Target List.

The Expert may perform virus and spyware scans, load or update drivers for peripherals, re-install the operating system and applications, back up the user's files, etc. using the System. In this way, the User obtains computer support remotely from the Expert. The Remote Computer Support may also be implemented using a KVM-over-IP device that replaces the Control Agent.

15.2. Remote IP PBX Phone System Deployment

IP PBXs are software-based phone systems that are typically installed and configured for each customer onsite. Using the techniques described above, an entire phone system may be authored and configured using the System where an Expert provides the installation and ongoing support and a User provides the configuration settings such as user lists, phone numbers and extensions. This configuration information may be extracted from a legacy phone system in the same way described herein.

15.3. Remote CRM/ERP System Deployments

A company's billing and customer management system may be created, deployed and customized using the System. An Expert may provide the installation and ongoing support for a Solution that is combined with a company's Site-Specific or Confidential Information and legacy data extracted in the same manner as described herein.

15.4. Enforcement of Service Level Agreements

Many IT systems have Service Level Agreements, termed SLAs, which specify benchmarks for the reliability or availability of a system or network. SLA benchmarks may include such performance measures as network throughput, transactions per second, web site latency, uptime, etc.

A Solution developed on the System may also contain SLA benchmarks. Using the Monitor Agent, the System may track these benchmarks and provide a way for a User to determine whether a Solution is operating as expected.

16. New Approach for Software Deployment

The System described herein may be used to provide an alternative way for a software vendor to distribute and deploy its products. That is, instead of distributing software as executable files via online download or CD-ROM (i.e., traditional distribution methods), a software vendor may use the System to deliver software to remote computers that may require more integration and/or customization than is possible using traditional distribution methods.

17. Generalization of Target

A Target may be any computing device or service (e.g. network-based server) that provides at least a processing unit, re-writable memory and network interface. Some examples of Target's are:

Laptop computer;
Desktop computer;
Thin client that lacks a hard disk and uses a network image for booting and a file system that resides on the System (and may also lack a video interface);
Server;
Virtual Server using either a Type 1 or Type 2 hypervisor and may include network booting from the System;
Clustered Server;
Utility Computers that are network-based virtual servers; and,
Emulator that functions like a computing device but is actually a software application running on a computing device.

The Target itself may also execute the Generator and Control software applications and issue commands to itself or a Virtual Server it hosts on itself.

18. Other

An embodiment of the invention may be a machine-readable medium having stored thereon data and instructions that cause a machine, including one or more programmable processors that may be distributed over a network (e.g., "network-based system") or that may all be local to the same server machine (e.g., "computing system") to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of medium including floppy disks, optical disks, compact disc read-only memory ("CD-ROM"), and magnetic-optical disks, read-only memories ("ROMs"), random access memories ("RAMs"), erasable, programmable read-only memories ("EPROMs"), electrically-erasable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required process steps. The required structure for a variety of these systems will appear from the description below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that improved computer software installation, configuration or maintenance procedures can also be achieved by software and hardware that distribute the functions of embodiments of this invention differently than herein described. Such variations and implementations are understood to be captured according to the following claims.

The invention claimed is:

1. A method for automating software installation, configuration or maintenance, comprising:
   maintaining, using input from a first user, a hierarchy of variables containing site-specific or confidential information;
   creating, using input from a second user, a set of parameterized commands for software installation, configuration, or maintenance, wherein the parameterized commands reference a local hierarchy of variables;
   applying the site-specific or confidential information of the first user to the set of parameterized commands of the second user to generate operating system native commands for software installation, configuration, or maintenance.

2. The method of claim 1, wherein the hierarchy of the first user or local hierarchy of the second user is used to determine any one of the following:
   the scope of values contained in the hierarchy of variables;
   the inheritance of values contained in the hierarchy of variables; or,
   the sequence in which parameterized commands are processed.

3. The method of claim 1, wherein operating system native commands are issued by a network-based system to a remote system over a digital network.

4. The method of claim 1, wherein operating system native commands are issued by a computing system to itself or a virtual environment running on itself.

5. The method of claim 1, further comprising:
   providing a graphical-interface or text-interface to a network-based system or a computing system; and,
   operating system native commands are entered into the graphical-interface or text-interface.

6. The method of claim 5, further comprising:
   recording, at the network-based system or the computing system, the operating system native commands entered by a user or the output generated by a remote system or a computing system;
   parsing the operating system native commands and output;
   separating the operating system native commands into operating system instructions and site-specific or confidential information containing (i) site-specific details of a network, hardware, or software environment; and, (ii) confidential details of an individual, group or entity including at least one of passwords, user accounts, or company records; and,
   extracting site-specific or confidential information from the output generated by the remote system or the computing system;
   converting an operating system native command into a parameterized command that is functionally equivalent to the original operating system native command but is comprised of one or more operating system instructions and one or more variables wherein the variables are substitutes for site-specific or confidential information; and,
   converting output from the remote system or the computing system into parameterized output that is functionally equivalent to the original output but is comprised of one or more operating system native outputs and one or more variables wherein the variables are substitutes for site-specific or confidential information.

7. The method of claim 3, wherein an operative connection between the network-based system and the remote system is established through:
   a tunneling connection established from the remote system to the network-based system; and,
   gateway forwarding of communication sessions from other computing devices to the remote system.

8. The method of claim 1, wherein maintaining the hierarchy of variables comprises at least one of the following:
   defining a new variable;
   placing a variable into the hierarchy of variables; or, relocating a variable within the hierarchy;
   specifying or changing a value for a variable, wherein the value represents site-specific or confidential information;
   specifying a default value for a variable, wherein the default value is applied to the variable when the variable is transferred between users;
   specifying permissible values or range of values for a variable; or
   specifying consistency rules across variables in the hierarchy.

9. The method of claim 1, wherein creating a set of parameterized commands specifies the local hierarchy of variables specific to the second user, wherein the second user may do at least one of the following:
   define a new variable;
   place a variable into the local hierarchy of variables; or, relocating a variable within the local hierarchy;
   specify a value for a variable, wherein the value represents site-specific or confidential information specific to the second user;
   specify a default value for a variable, wherein the default value is applied to the variable when the variable is transferred between users;
   specify permissible values or range of values for a variable; or
   specify consistency rules across variables in the local hierarchy.

10. The method of claim 1, wherein the first user acquires or imports all or a portion of the local hierarchy of variables created by the second user, the method comprising:
    replacing the site-specific or confidential information contained in the local hierarchy of variables of the second user with blank or default values;
    appending the imported local hierarchy of variables of the second user to the hierarchy of variables of the first user as a subset of the hierarchy of variables of the first user;

transferring the permissible values or range of values for a variable and consistency rules across variables specified in the local hierarchy of variables of the second user to the subset of the hierarchy of variables of the first user.

11. The method of claim 1, wherein the first user acquires the parameterized commands of the second user; and, the first user inserts these parameterized commands into a hierarchy of parameterized commands of the first user.

12. The method of claim 1, wherein an operating system native command is generated from a parameterized command, the method including the steps of:
    specifying the location in the hierarchy of variables from where a variable's scope is determined;
    identifying all variables contained in a parameterized command or set of parameterized commands;
    confirming that all variables contained in the parameterized command or set of parameterized commands exist in a user's hierarchy of variables at the specified location;
    calculating the value of each variable in the parameterized command or set of parameterized commands from the user's hierarchy of variables at the specified location;
    confirming that the value for each variable contains permissible values or range of values and that the values satisfy consistency rules, if defined;
    generating the operating system native command by substituting the calculated value for each variable in the parameterized command.

13. The method of claim 3, wherein a comparison of the output from the remote system to expected results controls the flow of parameterized command execution in real time, wherein any of the following subsequent parameterized commands may be converted into operating system native commands and issued to the remote system:
    a next parameterized command in a set of parameterized commands;
    a confirming parameterized command, wherein the confirming parameterized command is used to confirm that a previously-issued operating system native command was successfully executed by the remote system or a computing system;
    an exception parameterized command, wherein the exception parameterized command analyzes and resolves unexpected results;
    a negating parameterized command, wherein the negating parameterized command undoes the effect of a previously-issued parameterized command or set of parameterized commands; and,
    an updating parameterized command, wherein the updating parameterized command updates a configuration setting on the remote system or the computing system.

14. The method of claim 4, wherein a comparison of the output from the computing system to expected results controls the flow of parameterized command execution in real time, wherein any of the following subsequent parameterized commands may be converted into operating system native commands and issued to the computing system:
    a next parameterized command in a set of parameterized commands;
    a confirming parameterized command, wherein the confirming parameterized command is used to confirm that a previously-issued operating system native command was successfully executed by a remote system or the computing system;
    an exception parameterized command, wherein the exception parameterized command analyzes and resolves unexpected results;
    a negating parameterized command, wherein the negating parameterized command undoes the effect of a previously-issued parameterized command or set of parameterized commands; and,
    an updating parameterized command, wherein the updating parameterized command updates a configuration setting on the remote system or the computing system.

15. The method of claim 1, wherein the generated operating system native commands are arranged in an executable program or script.

16. The method of claim 1, wherein the second user creates a set of parameterized commands using a text editor wherein the parameterized commands may incorporate any of the following:
    a set of parameterized commands created by the second user or a third user;
    operating system native commands;
    instructions from a scripting language; or,
    variables that reference site-specific or confidential information arranged in the local hierarchy of variables.

17. The method of claim 1, wherein changes to a value in the hierarchy of variables maintained by a first user results in at least one the following:
    application of site-specific or confidential information of the first user to the set of configuration parameterized commands of the second user to generate operating system native commands for software configuration; or,
    application of site-specific or confidential information of the first user to the set of maintenance parameterized commands of the second user to generate operating system native commands for software maintenance.

18. A system to parameterize and generate operating system native commands, comprising:
    a separator to extract site-specific or confidential information from inputs to a graphical-interface or text-interface and outputs from a remote system or a computing system; and,
    a generator to apply site-specific or confidential information to parameterized commands to generate operating system native commands.

19. The system of claim 18, wherein:
    the generator and the separator are part of a network-based or distributed system;
    a graphical-interface or text-interface to the network-based system is provided over a digital network; and
    the network-based system maintains communication links to the remote system over the digital network.

20. The system of claim 18, wherein the generator and the separator are part of the computing system that is non-distributed or non-network based, and:
    the computing system provides a graphical-interface or text-interface;
    the computing system establishes and maintains an operative connection to itself or a virtual computing environment running on itself.

21. The system of claim 18, wherein the separator contains a context analyzer to identify site-specific or confidential information using the context of the operating system native command or output.

22. The system of claim 18, wherein a profile manager provides a connection to:
    the graphical-interface or text-interface; or,
    the separator to update a user's hierarchy of variables with values or new variables obtained from an operating system native command or output.

23. The system of claim 18, wherein the separator and the generator access a database containing at least one of:
- a hierarchy of variables containing the site-specific or confidential information of a first user; or,
- a set of parameterized commands of a second user.

24. A system for software installation, configuration or maintenance, comprising:
- a machine-readable medium in which are stored a hierarchy of variables that contain site-specific or confidential information from a first user,
- a set of parameterized commands for software installation, configuration, or maintenance from a second user, and
- a control software application that issues operating system native commands.

25. The system of claim 24, wherein the machine-readable medium are distributed such that the control software application executes on a network-based system and issues the operating system native commands to a remote system over a digital network wherein the remote system may be at least one of:
- a physical computing system comprising at least a central processing unit, digital network communications interface and re-writable memory;
- a virtual computing environment that connects to the network-based system over a physical or virtual digital network; or,
- a group of physical computing systems interconnected in a grid or cluster arrangement.

26. The system of claim 25, wherein the network-based system maintains communication or signaling links to the remote system using a border controller, wherein:
- the border controller provides security to the network-based system against intrusions; or,
- the border controller maintains an opening on a firewall device located on a local area network of the remote system.

27. The system of claim 25, wherein a software agent running on the remote system is used to connect the remote system to the network-based system.

28. The system of claim 25, wherein a software agent running on the remote system does at least one of the following:
- automatically analyzing the remote system's hardware environment and transmitting that information to the network-based system;
- automatically analyzing the remote system's software environment and transmitting that information to the network-based system; or,
- automatically analyzing the remote system's network environment and transmitting that information to the network-based system.

29. The system of claim 25, wherein the remote system is accessed via an intermediary device positioned between the remote system and the network-based system, wherein the intermediary device connects to the remote system over a physical or virtual digital network.

30. The system of claim 24, wherein a control application executes on a computing system and issues operating system native commands to itself or a virtual computing environment running on itself.

31. The system of claim 24, wherein the set of parameterized commands for software installation, configuration, or maintenance from the second user is acquired by the first user and combined with the site-specific or confidential information of the first user to generate the operating system native commands.

32. An article of manufacture comprising a machine-readable medium with instructions stored therein, which when executed by a machine, cause the machine to:
- maintain a hierarchy of variables containing site-specific or confidential information for a first user;
- apply the site-specific or confidential information of the first user to a set of parameterized commands for software installation, configuration, or maintenance created by a second user, wherein the parameterized commands reference a local hierarchy of variables defined by the second user;
- incorporate the local hierarchy of variables defined by the second user into the hierarchy of variables maintained by the first user; and,
- generate operating system native commands for software installation, configuration, or maintenance which contain site-specific or confidential information of the first user.

* * * * *